(12) United States Patent
Yao

(10) Patent No.: US 10,175,775 B2
(45) Date of Patent: Jan. 8, 2019

(54) KEYBOARD SET

(71) Applicant: Bing-Yang Yao, Taipei (TW)

(72) Inventor: Bing-Yang Yao, Taipei (TW)

(*) Notice: Subject to any disclaimer, the term of this patent is extended or adjusted under 35 U.S.C. 154(b) by 0 days.

(21) Appl. No.: 15/581,597

(22) Filed: Apr. 28, 2017

(65) Prior Publication Data

US 2017/0315625 A1 Nov. 2, 2017

(30) Foreign Application Priority Data

Apr. 29, 2016 (TW) .............................. 105113613 A

(51) Int. Cl.
*G06F 3/02* (2006.01)
*A47C 7/72* (2006.01)

(52) U.S. Cl.
CPC .............. *G06F 3/0216* (2013.01); *A47C 7/72* (2013.01); *G06F 3/0208* (2013.01)

(58) Field of Classification Search
CPC ........ G06F 3/0216; G06F 3/0208; A47C 7/62
See application file for complete search history.

(56) References Cited

U.S. PATENT DOCUMENTS

| | | | | |
|---|---|---|---|---|
| 5,122,786 A * | 6/1992 | Rader | ......................... | B41J 5/10 248/917 |
| 5,311,210 A * | 5/1994 | O'Brien | ................... | A47C 7/72 248/181.1 |
| 6,712,533 B2 * | 3/2004 | Chen | ..................... | G06F 3/0202 400/472 |
| 7,109,893 B2 * | 9/2006 | Chen | ..................... | G06F 1/1616 341/22 |
| 7,694,883 B2 * | 4/2010 | Ohashi | ................. | G06K 19/077 235/487 |
| 8,289,684 B2 * | 10/2012 | Hargreaves | ........... | G06F 3/0208 361/679.01 |
| 8,511,626 B1 * | 8/2013 | Trinh | ..................... | B60K 35/00 248/187.1 |
| 8,902,167 B2 * | 12/2014 | Linegar | ................. | G06F 1/1664 345/168 |
| 9,652,050 B2 * | 5/2017 | Norwalk | ................ | G06F 3/0202 |
| 2017/0315625 A1 * | 11/2017 | Yao | ........................ | G06F 3/0216 |

* cited by examiner

*Primary Examiner* — Kent W Chang
*Assistant Examiner* — Nathaniel P Brittingham

(57) ABSTRACT

A keyboard set may be provided on chair armrests. The keyboard set includes a left keyboard, a right keyboard, a first detachable support, a second detachable support, and two multidirectional angle adjusting mechanisms. Each of the left keyboard and the right keyboard includes a plurality of keys. One end of the first detachable support is combined with the left keyboard, and one end of the second detachable support is combined with the right keyboard. The two multidirectional angle adjusting mechanisms are respectively provided between the first detachable support and the left keyboard, and between the second detachable support and the right keyboard.

20 Claims, 32 Drawing Sheets

KEYBOARD SET

CROSS-REFERENCE TO RELATED APPLICATION

This non-provisional application claims priority under 35 U.S.C. § 119(a) to Patent Application No. 105113613 filed in Taiwan, R.O.C. on Apr. 29, 2016, the entire contents of which are hereby incorporated by reference.

BACKGROUND

Technical Field

The present invention relates to a keyboard set of a computing device such as a computer, a mobile device, or a head-up display/head-mounted display/virtual reality display device, and in particular, to a keyboard set which can be quickly disassembled to a detachable support and angles of which can be adjusted in multiple directions.

Related Art

People who need to work with a keyboard for long working hours, such as: writers and computer programmers, often suffer fatigue or even permanent damages to shoulders, a neck, air is, or wrists because of an incorrect posture. Therefore, a lot of prior art devices that use ergonomic designs emerge at the right moment.

Prior art I, "Ergonomic Keyboard And Operator's Chair" with a U.S. Pat. No. 5,311,210 (inventors: O'Brien et al.) discloses a combination device of a chair and a keyboard. The device is an ergonomic device that is integrally formed by a chair, armrests, and a keyboard. Although the device provides sufficient support to a back, arms and palms of a user to reduce fatigue and damages, the keyboard thereof cannot be adapted to other chairs with armrests, and cannot be moved to a desktop for use when needed either. An overall cost of the device is considerable, and consequently, production and promotion of the device are difficult.

Prior art II, "Ergonomic Keypads For Desktop And Armrest Applications" with a U.S. Pat. No. 5,122,786 (the inventor: Rader) discloses an ergonomic keypad adapted to both a desktop and chair armrests. Although the keypad in the prior art II may be mounted on the chair armrests or the desktop for use according to requirements of a user, the keypad needs to cooperate with particular armrest members. Consequently, the keypad cannot be randomly mounted on other chairs with armrests.

The devices in the foregoing prior arts cannot be mounted on existing chair armrests, and therefore, special armrest members are needed to replace the original chair armrests, or even the entire chair needs to be replaced. Therefore, people who need to type data by using a keyboard for long working hours cannot directly mount the keyboards disclosed in the prior arts on existing chair armrests. That is, the prior arts cannot satisfy the user requirements. Therefore, it is really necessary to improve the prior arts to provide a keyboard device that can be used on a desktop or can be mounted on general existing chair armrests according to user requirements, so as to make up for deficiencies of the prior arts. In addition, the devices in the prior arts lack of expandability due to limited space of the chair armrests, and a user cannot add other input/control devices to the devices in the prior arts. Therefore, the present invention improves the prior arts to provide an armrest keyboard having expansibility, and a joystick/numeric keyboard/mouse/trackball/touch panel can be added to the keyboard according to user requirements.

SUMMARY

In view of this, the present invention provides a keyboard set adapted to a general desktop and a general chair with armrests. The objective of the present invention lies in that a user can improve a posture during keyboard operation by using a general existing ergonomic chair having armrests, so as to reduce fatigue and damages; and may also move the keyboard to a general desktop for use according to requirements of the user.

An embodiment of the present invention provides a keyboard set. The keyboard set includes a left keyboard, a right keyboard, a first detachable support, a second detachable support, and two multidirectional angle adjusting mechanisms. Each of the left keyboard and the right keyboard includes a plurality of keys, and the right keyboard is in a communication connection to the left keyboard. One end of the first detachable support is connected to the left keyboard, and one end of the second detachable support is connected to the right keyboard. Each of the multidirectional angle adjusting mechanisms includes a spherical ball member and a hemi-spherical receptacle. The two spherical ball members are respectively and correspondingly provided on one end of the first detachable support and the second detachable support. The two hemi-spherical receptacles are respectively provided on the left keyboard and the right keyboard. The spherical ball member of the first detachable support is detachably and correspondingly provided in the hemi-spherical receptacle of the left keyboard. The spherical ball member of the second detachable support is detachably and correspondingly provided in the hemi-spherical receptacle of the right keyboard. An angle adjustment in any direction can be supported by using the multidirectional angle adjusting mechanisms.

Another embodiment of the present invention provides a keyboard set. The keyboard set includes a left keyboard, a right keyboard, a first detachable support, a second detachable support, and two multidirectional angle adjusting mechanisms. The left keyboard includes a plurality of keys and a first link mechanism. The right keyboard includes a plurality of keys and a second link mechanism, where the right keyboard is in a communication connection to the left keyboard. The first detachable support includes a third link mechanism, a first body, and a first base. The third link mechanism and the first base are respectively connected to two ends of the first body. The third link mechanism of the first detachable support is detachably and correspondingly connected to the first link mechanism of the left keyboard. The second detachable support includes a fourth link mechanism, a second body, and a second base. The fourth link mechanism and the second base are respectively connected to two ends of the second body. The fourth link mechanism of the second detachable support is detachably and correspondingly connected to the second link mechanism of the right keyboard. Each of the multidirectional angle adjusting mechanisms includes a spherical ball member and a hemi-spherical receptacle. The two spherical ball members are respectively and correspondingly provided on one end, opposite to the third link mechanism, of the first body of the first detachable support and one end, opposite to the fourth link mechanism, of the second body of the second detachable support. The two hemi-spherical receptacles are respectively provided on the first base of the first detachable support and the second base of the second detachable support. The spherical ball member of first detachable support is detachably and correspondingly provided in the hemi-spherical receptacle of the first base. The spherical ball member of the second detachable support is detachably and correspondingly provided in the hemi-spherical receptacle of the second base.

Another objective of the present invention is providing an armrest keyboard having expansibility, where other detachable expansion devices can be externally connected to the keyboard according to user requirements, so as to operate an added joystick/numeric keyboard/mouse/trackball/touch panel on armrests having limited space.

In some embodiments of the present invention, the left keyboard and the right keyboard are separately provided with a USB connector for connecting a detachable expansion device. Moreover, the detachable expansion device may be a trackball, a joystick, a mouse, a touch panel, or a numeric keyboard.

Still another objective of the present invention is providing a keyboard mounted on armrests. When a user stands up from an armchair or sits into the armchair, the keyboard may be rotated to prevent an access from being blocked or the keyboard from being hit.

In some embodiments of the present invention, the first base and the second base may be respectively connected to an armrest of a chair.

In some embodiments of the present invention, the first detachable support and the second detachable support are separately provided with a pivoting member, and can rotate towards an outer side of the chair armrest.

The following describes detailed features and advantages of the present invention in implementation manners, which can enable any person skilled in the art to know technical content of the present invention and perform implementation accordingly. Moreover, according to content disclosed in the specification, the application patent scope, and accompanying drawings, any person skilled in the art may easily understand the objectives and advantages related to the present invention.

DETAILED DESCRIPTION

The present invention is applied to a computing device such as, but not limited to, a PC/Mac, a laptop/notebook/portable computer, a smartphone, a tablet PC, a smart TV, a head-up display/head-mounted display/virtual reality display device, or a video game console/TV game console. The computing device is in a communication connection to a keyboard set 10. A manner of the communication connection may be a wireless or wired communication manner.

The accompanying drawings of the present description are used to describe functions and technical features of the present invention, and are not intended to limit the appearance of the present invention.

A first embodiment of the present invention provides a set of separated keyboard set 10 (including a left keyboard 12 and a right keyboard 14) and a plurality of different detachable supports to be adapted to various existing armrests with different shapes. The "a plurality of different detachable supports" refers to that support bodies have different lengths, and "a plurality of different detachable supports" is formed by the support bodies matching bases with different shapes or/and fixing manners. A user may select, according to an existing armchair, proper detachable supports (including a body and a base, and the same applies to the following), to be fixed on armrests after the selected detachable supports are combined with the keyboard set 10. Although when the user detaches the keyboard set 10 and moves the keyboard set 10 to a desktop to be used, the detachable supports left on the armrests do not affect use of the original chair due to a small volume.

Figure 1A:
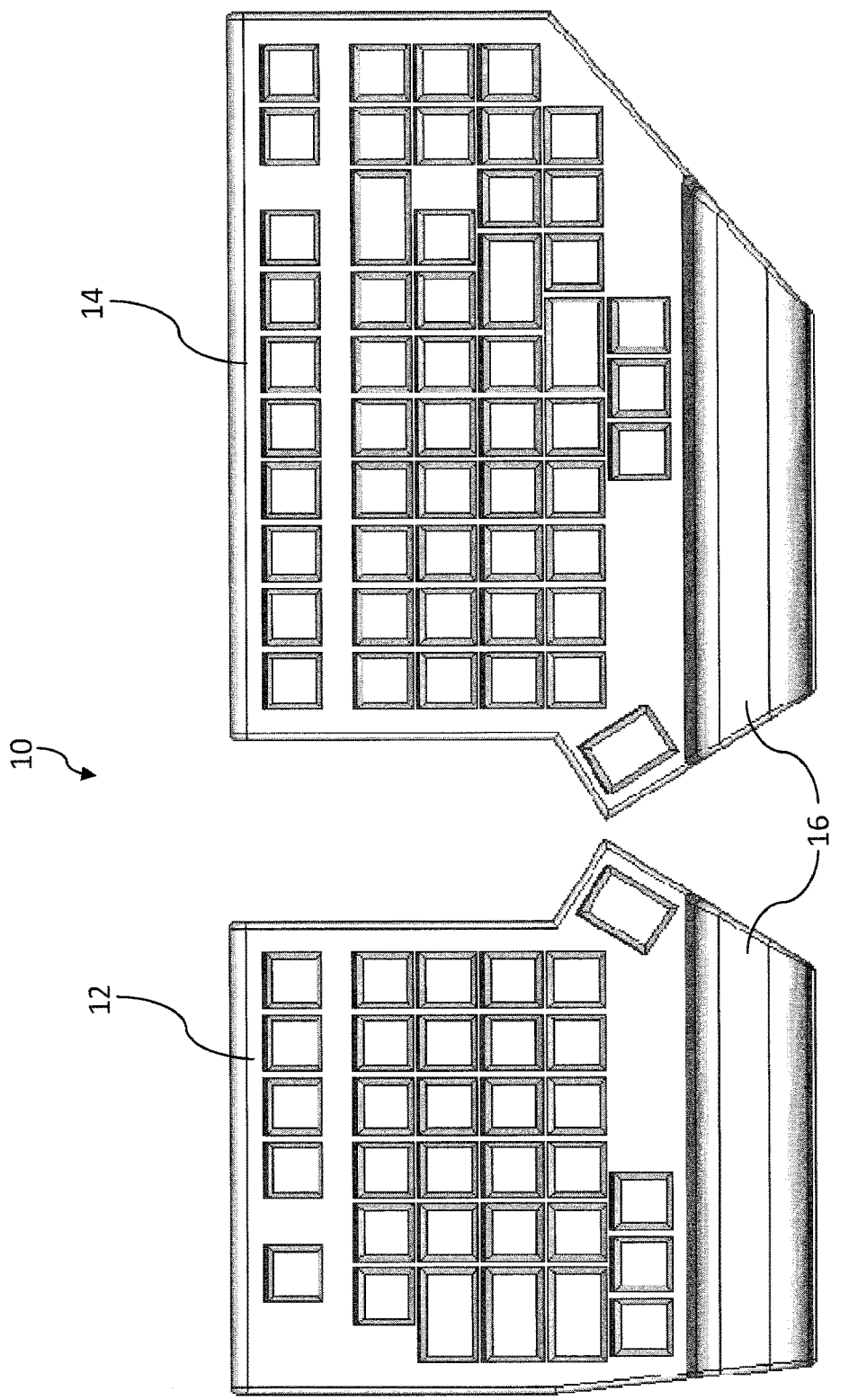
FIG. 1A is a top view of a keyboard set according to a first embodiment of the present invention.

Referring to FIG. 1A, FIG. 1A is a top view of the keyboard set 10 according to the first embodiment of the present invention. A separated design is used for the keyboard set 10 of the present invention. The keyboard set 10 includes a left keyboard 12 and a right keyboard 14, which are designed to be mounted on the two armrests of an existing chair. Each of the left keyboard 12 and the right keyboard 14 is provided with a plurality of keys thereon, and is provided with a palm support area 16. In some embodiments of the present invention, the left keyboard 12, the right keyboard 14, and a computing device (computer/smartphone/tablet PC/smart TV/virtual reality display device/video game console or TV game console) are paired with each other in a wireless manner, for example: Wi-Fi, Bluetooth, RF, or other wireless technologies. Therefore, each of the left keyboard 12 and the right keyboard 14 is provided with a wireless module and a battery powering module. In some embodiments of the present invention, the left keyboard 12 is connected to the right keyboard 14 in a wired manner, for example: a USB connection cable or a PS/2 connection cable. Moreover, only one of the left keyboard 12 or the right keyboard 14 is provided with a wireless module, to be paired with a wireless module of the computing device. That is, the computing device is connected to the keyboard set 10 in a wireless manner Each of the left keyboard 12 and the right keyboard 14 may be provided with a battery powering module (to prolong a power use time), or only one of the left keyboard 12 or the right keyboard 14 is provided with a battery powering module (to save a module cost). In some embodiments of the present invention, the left keyboard 12, the right keyboard 14, and the computing device may be connected to each other in a wired manner.

Figure 1B:
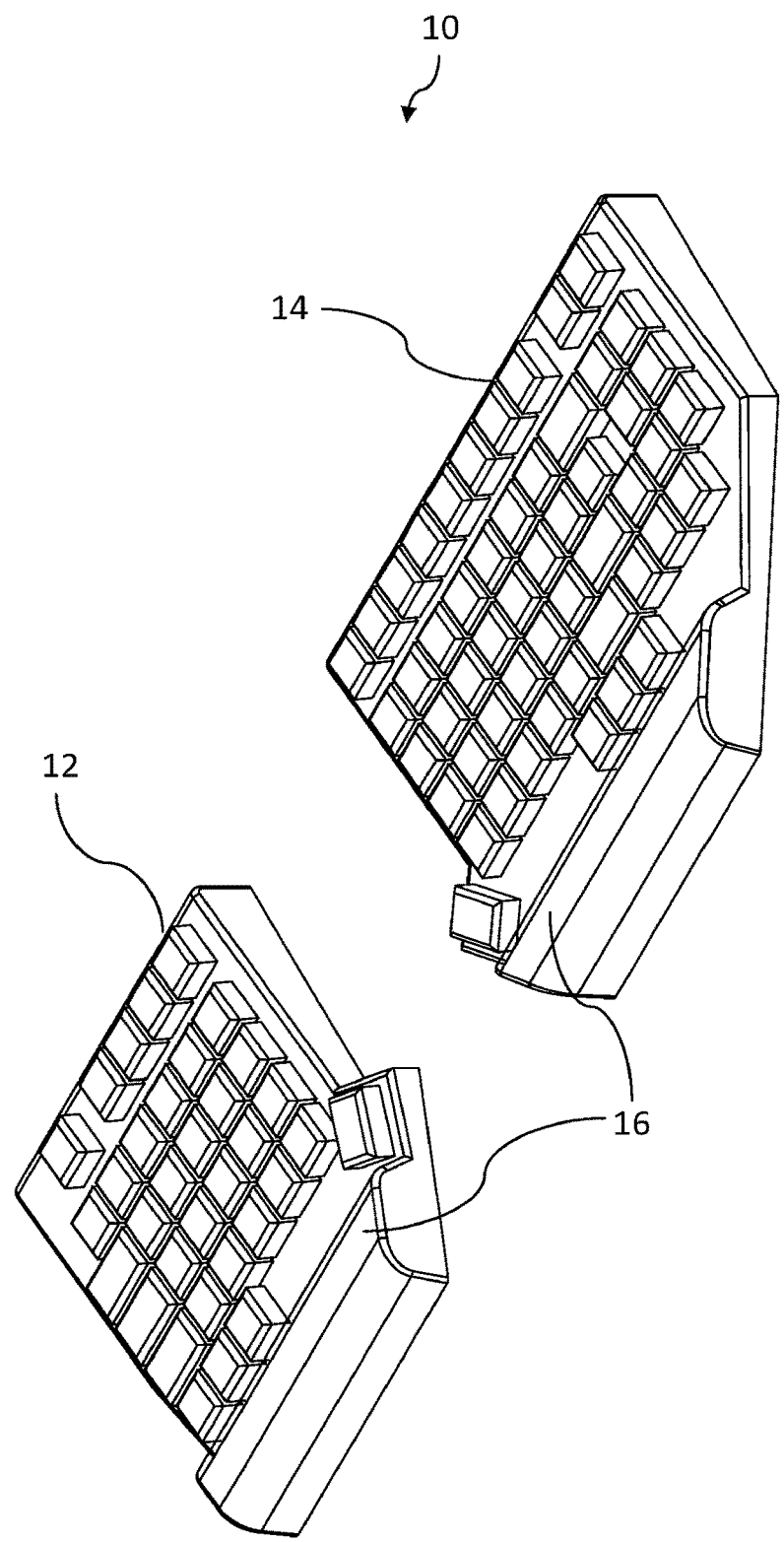
FIG. 1B is an axonometric view of a keyboard set according to a first embodiment of the present invention.

Referring to FIG. 1B, FIG. 1B is an axonometric view of the keyboard set 10 according to the first embodiment of the present invention, and is equivalent to a schematic diagram when the keyboard set 10 is used on a desktop. The left keyboard 12 is separated from the right keyboard 14 in design. Therefore, when the keyboard set 10 is used on the desktop, a user may randomly move a distance and an angle between the left keyboard 12 and the right keyboard 14 (that is, an included angle between two palms when the keyboard set is placed horizontally), to obtain, by means of adjustment, a posture most suitable for operating the keyboard set. Although in some embodiments of the present invention, the left keyboard 12 is connected to the right keyboard 14 in a wired manner, the keyboard set 10 of the present invention is mainly applied to an existing armchair. Therefore, a connection cable between the left keyboard 12 and the right keyboard 14 needs to be long enough to satisfy all single-person armchairs (that is, greater than a distance between the two armrests of a single-person chair). In this case, a length of the connection cable also satisfies use requirements of the user on the desktop.

Figure 2:
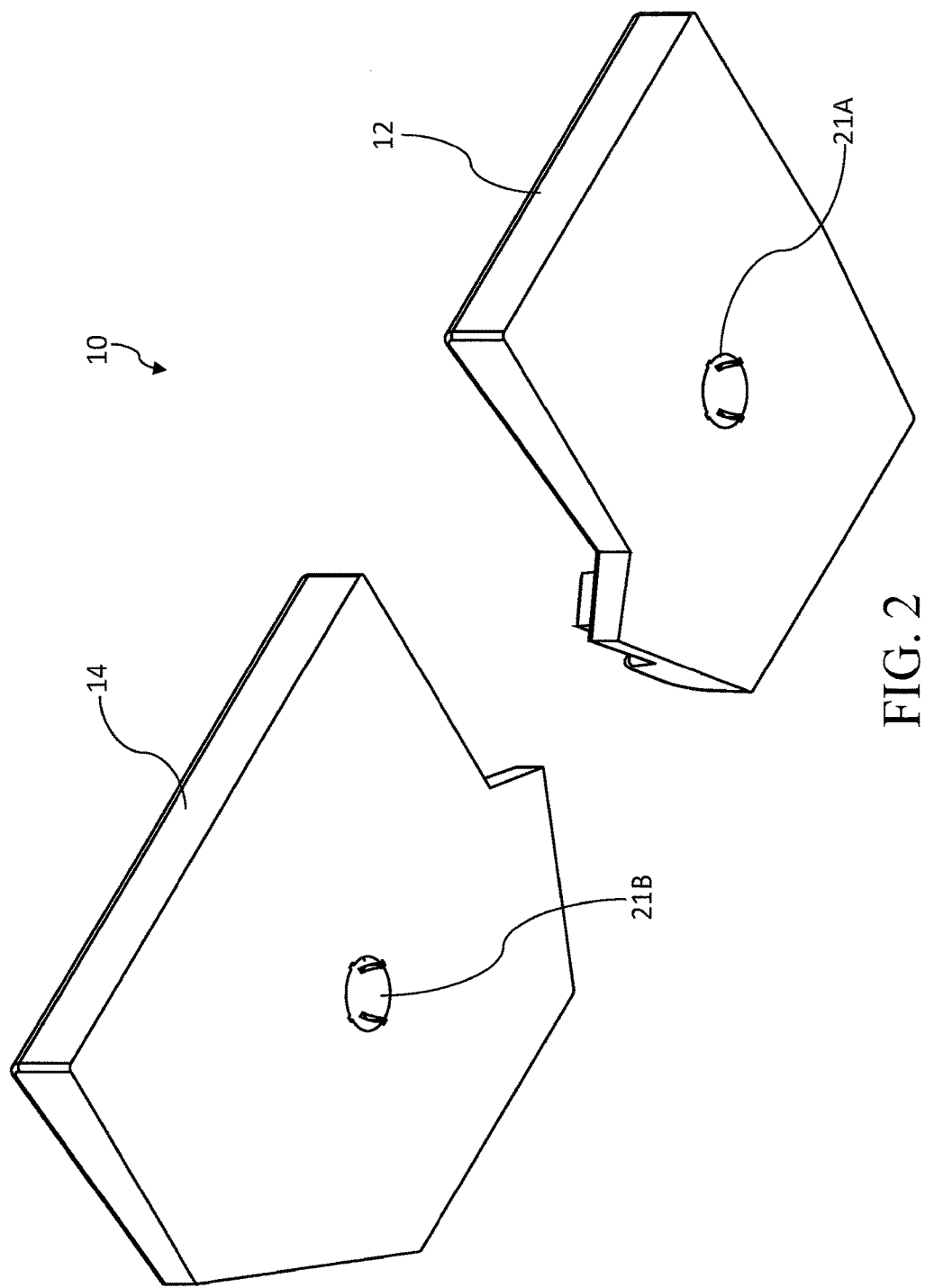
FIG. 2 is an axonometric bottom view of the keyboard set according to the first embodiment of the present invention.
Figure 3:
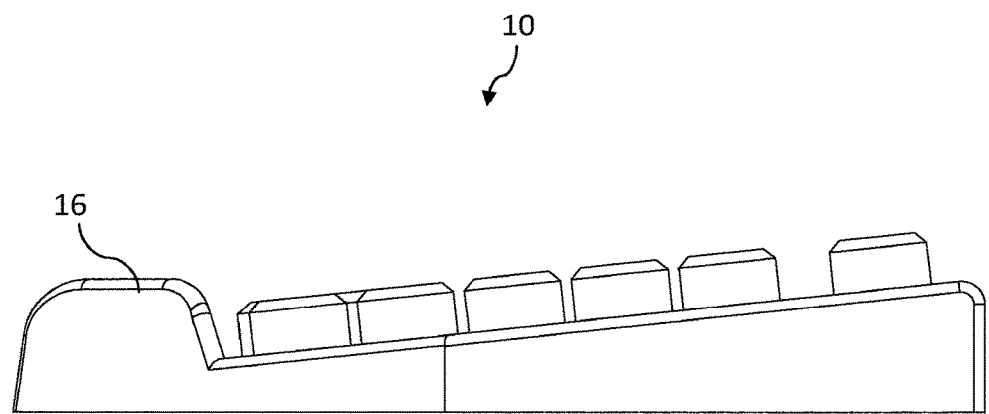
FIG. 3 is a right view of the keyboard set according to the first embodiment of the present invention.
Figure 4:
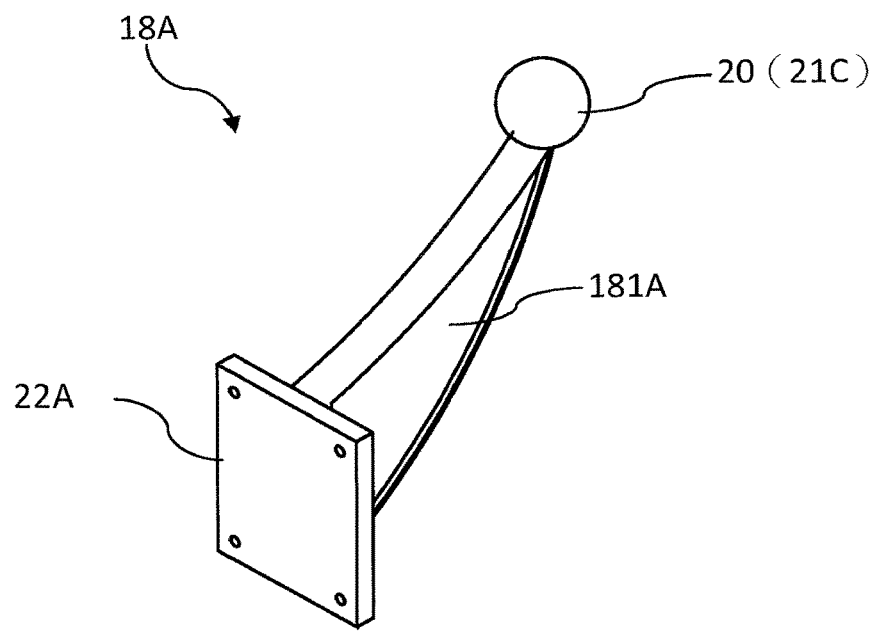
FIG. 4 is an axonometric view of a first detachable support according to the first embodiment of the present invention.
Figure 5:
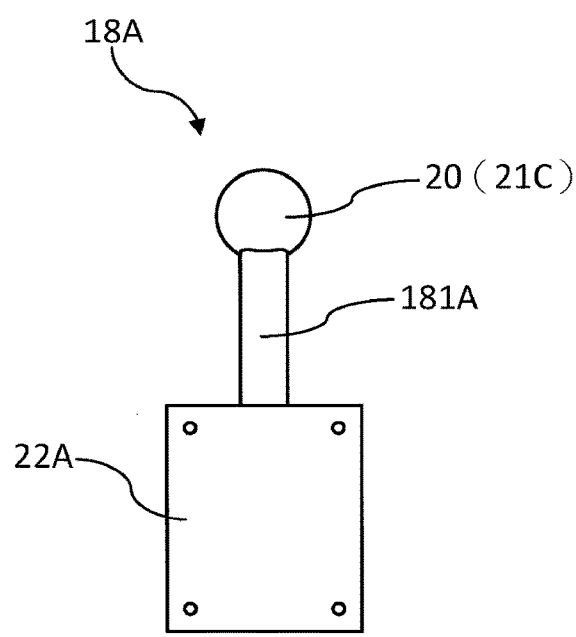
FIG. 5 is a front view of the first detachable support according to the first embodiment of the present invention.
Figure 6:
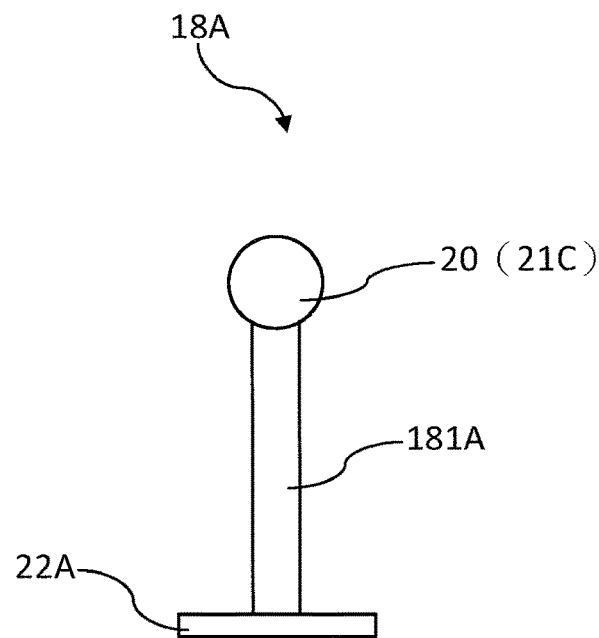
FIG. 6 is a top view of the first detachable support according to the first embodiment of the present invention.
Figure 7:
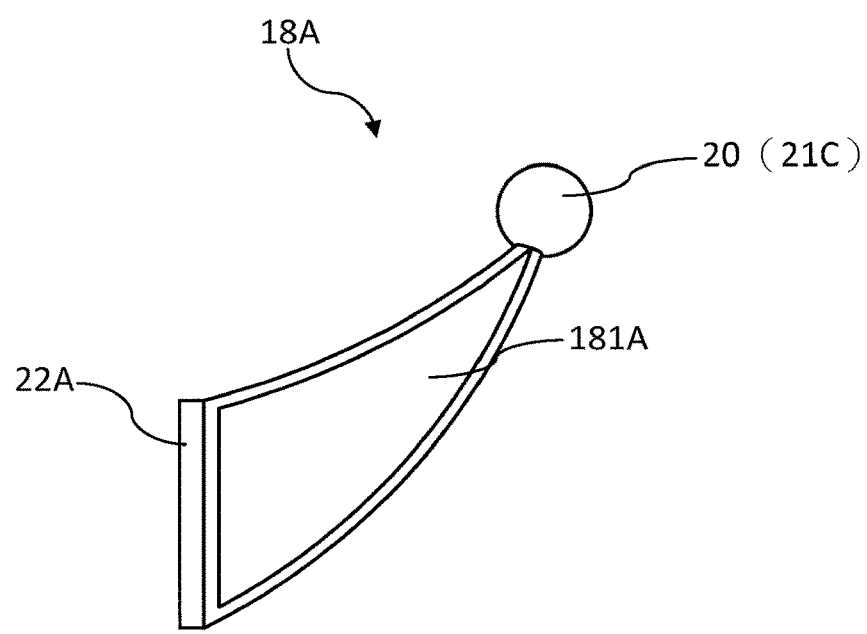
FIG. 7 is a right view of the first detachable support according to the first embodiment of the present invention.
Figure 8:
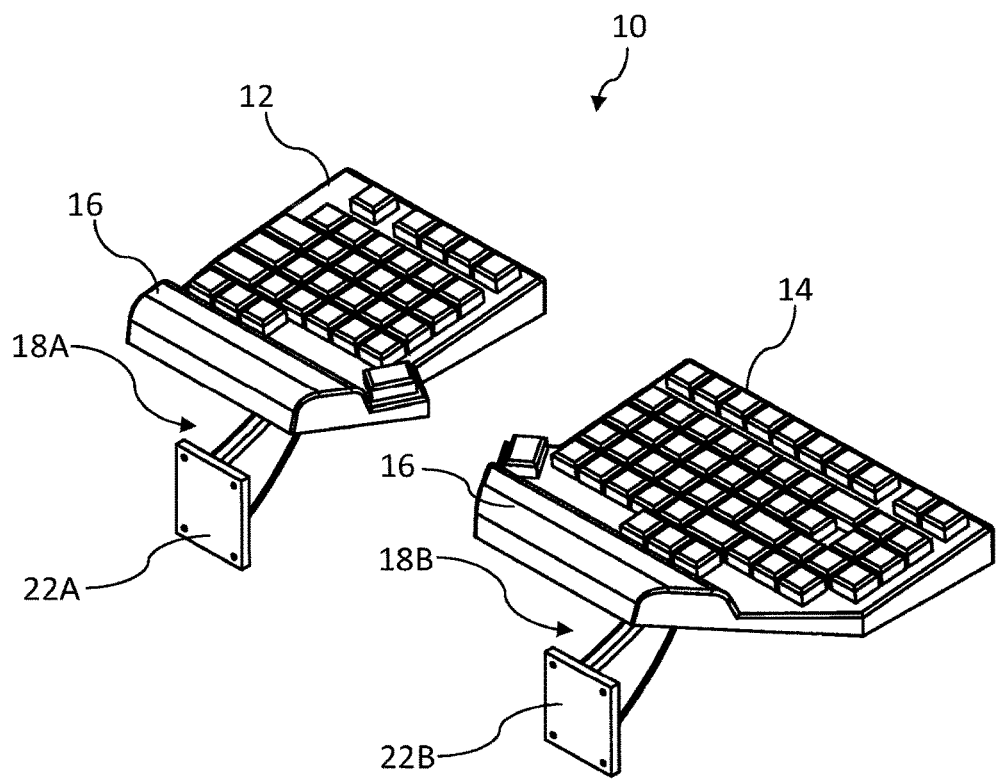
FIG. 8 is an axonometric view of a combination of the keyboard set, the first detachable support and a second detachable support according to the first embodiment of the present invention.
Figure 9:
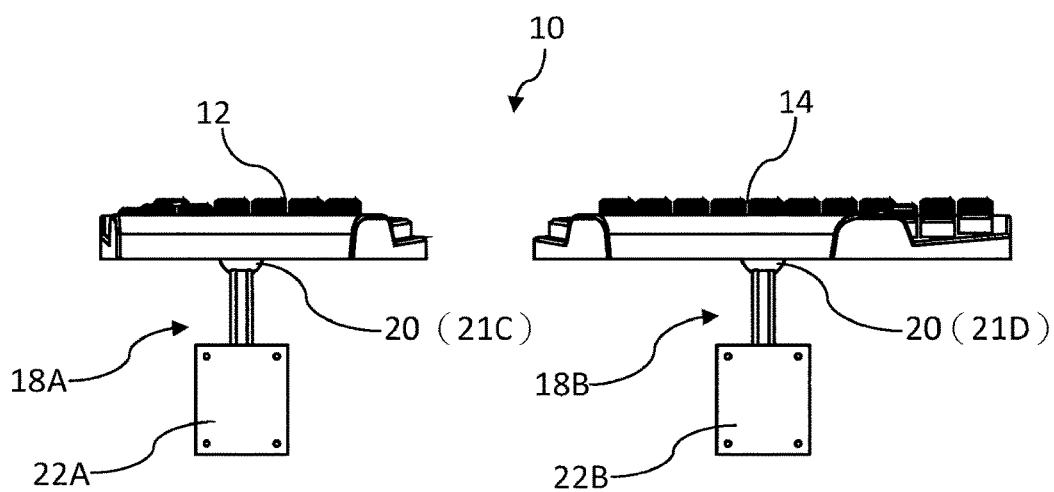
FIG. 9 is a front view of the combination of the keyboard set, the first detachable support and the second detachable support according to the first embodiment of the present invention.
Figure 10:
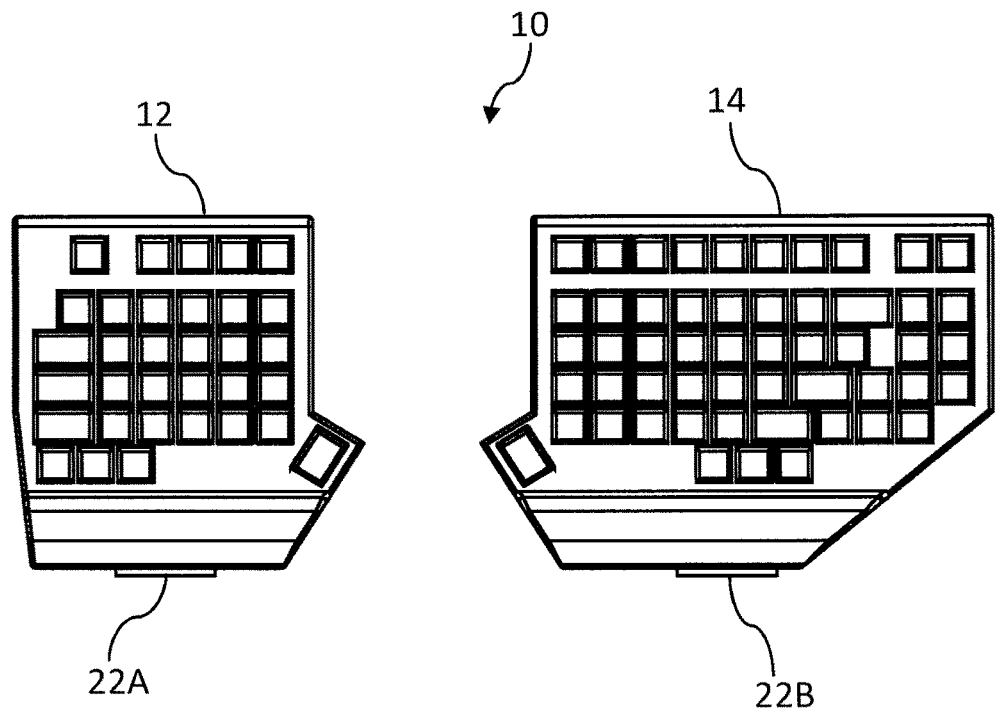
FIG. 10 is a top view of the combination of the keyboard set, the first detachable support and the second detachable support according to the first embodiment of the present invention.
Figure 11:
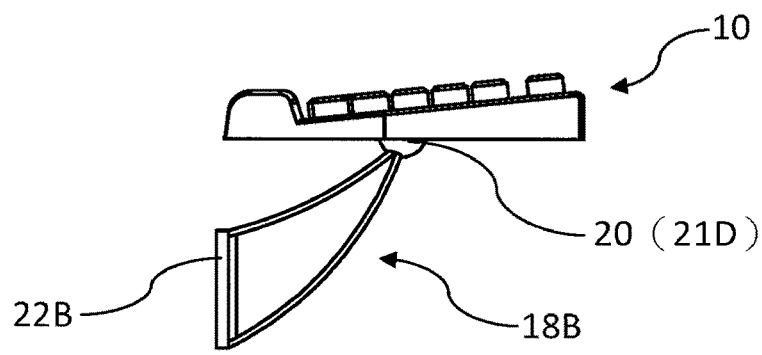
FIG. 11 is a right view of the combination of the keyboard set, the first detachable support and the second detachable support according to the first embodiment of the present invention.
Figure 12:
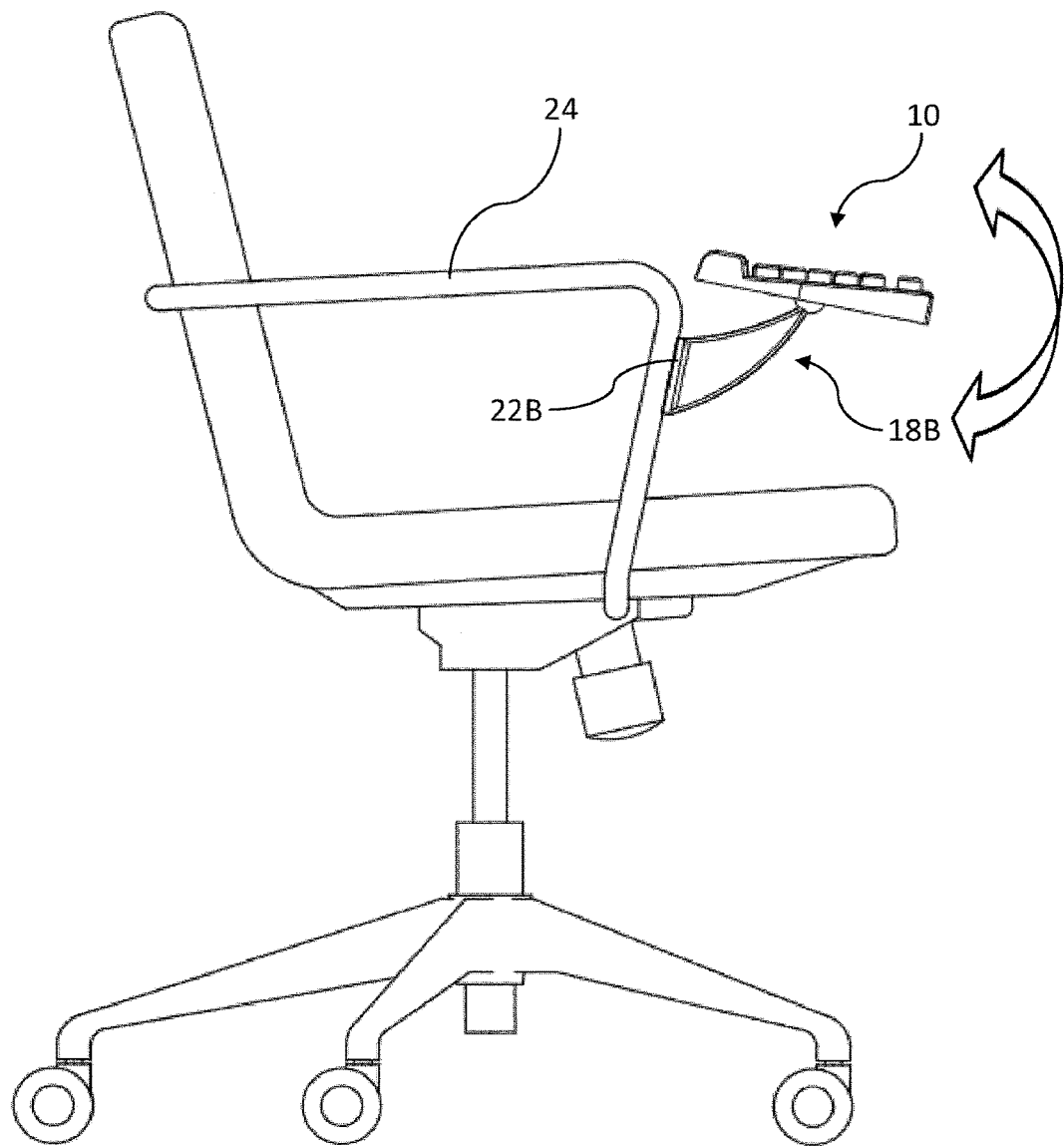
FIG. 12 is a right view of a combination of a right keyboard, the second detachable support, and an inverted L-shaped armchair according to the first embodiment of the present invention.

Subsequently, refer to FIG. 2 to FIG. 12 at the same time. FIG. 2 is an axonometric bottom view of the keyboard set according to the first embodiment of the present invention. FIG. 3 is a right view of the keyboard set according to this embodiment. FIG. 4 is an axonometric view of a detachable support. FIG. 5 is a front view of the detachable support. FIG. 6 is a top view of the detachable support. FIG. 7 is a right view of the detachable support. FIG. 8 is an axonometric view of a combination of the keyboard set, the first detachable support and a second detachable support. FIG. 9 is a front view of the combination of the keyboard set, the first detachable support and the second detachable support. FIG. 10 is a top view of the combination of the keyboard set, the first detachable support and the second detachable support. FIG. 11 is a right view of the combination of the keyboard set, the first detachable support and the second detachable support. FIG. 12 is a right view of a combination of a right keyboard, the first and second detachable supports, and an inverted L-shaped armchair according to this embodiment.

When the keyboard set 10 is to be mounted on armrests of a chair, a pair of detachable supports will be used (for ease of description, the detachable supports are represented by a first detachable support 18A and a second detachable support 18B below). Bottom portions of the left keyboard 12 and the right keyboard 14 of this embodiment are respectively provided with a first link mechanism 21A and a second link mechanism 21B. The first link mechanism 21A and the second link mechanism 21B are configured to be combined with the detachable supports. The first detachable support 18A includes a third link mechanism 21C, and the second detachable support 18B includes a fourth link mechanism 21D. However, the "detachable" in this embodiment refers that the supports can be easily combined with and detached from the keyboard set 10. That is, a link mechanism is a quick-detachable mechanism that can be combined and detached repeatedly. In the first embodiment of the present invention, a multidirectional angle adjusting mechanism is used as the link mechanism, to achieve quick combination and detachment. Herein, the multidirectional angle adjusting mechanism is a spherical joint set, i.e., a set in which two spherical ball members 20 match two hemi-spherical receptacles. The two spherical ball members 20 are respectively located on one end of the first detachable support 18A and the second detachable support 18B, i.e., the third link mechanism 21C and the fourth link mechanism 21D. The two hemi-spherical receptacles are respectively located on bottom portions of the left keyboard 12 and the right keyboard 14 (as shown in FIG. 2), i.e., the first link mechanism 21A and the second link mechanism 21B.

Referring to FIG. 3, in the first embodiment of the present invention, the palm support area 16 designed as a protruding block (i.e., shown in the figure). Moreover, a keys area is designed as a slope. That is, the palm support area 16 is not on the same plane as the keys area. In some embodiments, the palm support area 16 and the keys area may also be designed as a plane.

In some embodiments, the link mechanisms may also combine the keyboard set with the detachable supports by using a magnet combination. For example, the first link mechanism 21A, the second link mechanism 21B, the third link mechanism 21C, and the fourth link mechanism 21D are all magnets; or the first link mechanism 21A and the second link mechanism 21B are magnets, and the third link mechanism 21C and the fourth link mechanism 21D are magnetic metals. Or the first link mechanism 21A and the second link mechanism 21B are magnetic metals, and the third link mechanism 21C and the fourth link mechanism 21D are magnets. In some embodiments, a hook-and-loop (or referred to as Velcro, not drawn) may be used to combine the keyboard set with the detachable supports. The detachable supports of this embodiment are described below (that is, the link mechanism is a multidirectional angle adjusting mechanism, i.e., a spherical ball member and a hemi-spherical receptacle).

Referring to FIG. 4 to FIG. 7, subsequently, details are described by using the first detachable support 18A as an example. The second detachable support 18B has the same structure as the first detachable support 18A, and differs from the first detachable support 18A merely in that a keyboard set to which the second detachable support 18B is linked is the right keyboard 14. Therefore, details of the structure of the second detachable support 18B are not described herein again. One end of a first body 181A of the first detachable support 18A of this embodiment is the spherical ball member 20 (i.e., the third link mechanism 21C) configured to be combined with the bottom portion of the left keyboard 12, and the other end is a first base 22A configured to be fixed on the armrest of the chair. Due to a structural characteristic that the spherical ball member 20 is combined with the hemi-spherical receptacle (i.e., the first link mechanism 21A), the left keyboard 12 is enabled to support a multidirectional angle adjustment after being combined with the first detachable support 18A. That is, the spherical ball member 20 and the hemi-spherical receptacle of this embodiment are combined to form a "multidirectional angle adjusting mechanism". In some embodiments, the multidirectional angle adjusting mechanism may be applied to a position at which the first detachable support 18A and the second detachable support 18B are combined with the armrests. The first base 22A of the first detachable support 18A and the second base 22B of the second detachable support 18B of this embodiment are respectively fixed on the armrests by means of a fixing member. The fixing member may be: a screw, a double-sided adhesive, a clamp, and/or an adjustable zip tie (also as known as, a tooth zip tie, a tooth cable tie, a cable tie, or a hose tie), or any combination of the foregoing, for example: the bases are fixed by using the double-sided adhesive and the adjustable zip tie at the same time. As shown in FIG. 12, the second detachable support 18B of this embodiment may be adapted to an inverted L-shaped armrest 24.

Referring to FIG. 8, FIG. 9, FIG. 10, and FIG. 11, FIG. 8, FIG. 9, FIG. 10, and FIG. 11 are schematic diagrams of a combination of the keyboard set, the first detachable support, and the second detachable support according to this embodiment. Statuses when the left keyboard 12 is used in combination with the first detachable support 18A and when the right keyboard 14 is used in combination with the second detachable support 18B can be seen from FIG. 8, FIG. 9, FIG. 10, and FIG. 11. It can also be seen from these figures that one end of a second body 181B of the second detachable support 18B of this embodiment is the spherical ball member 20 (i.e., the fourth link mechanism 21D) configured to be combined with the bottom portion of the right keyboard 14, and the other end is a second base 22B configured to be fixed on the armrest of the chair. Due to a structural characteristic that the spherical ball member 20 is combined with the hemi-spherical receptacle (i.e., the second link mechanism 21B), the right keyboard 14 is enabled to support a multi-directional angle adjustment after being combined with the second detachable support 18B.

Referring to FIG. 12, the armchair in FIG. 12 is a general existing chair. FIG. 12 is merely intended to describe a relationship between this type of armrests and the present invention, and other components of the chair (such as a chair back, a chair surface, a pneumatic lifting device, or a wheel) are irrelevant to the present invention. FIG. 12 is not intended to limit appearance of the armchair adapted to the present invention. A width of an upright strut of such the inverted L-shaped armrest 24 (or referred to as an L-shaped armrest) (i.e., a strut fixed by a base) is the same as that of the armrest. That is, the upright strut has an enough width (area) for fixing a planar base (i.e., the first base 22A of the first detachable support 18A or the second base 22B of the second detachable support 18B of this embodiment, as shown in FIG. 8). FIG. 12 is a right view, and therefore, only a schematic diagram of the combination of the right keyboard 14, the second base 22B of the second detachable support 18B, and the L-shaped armrest 24 of the chair is seen.

Figure 13:
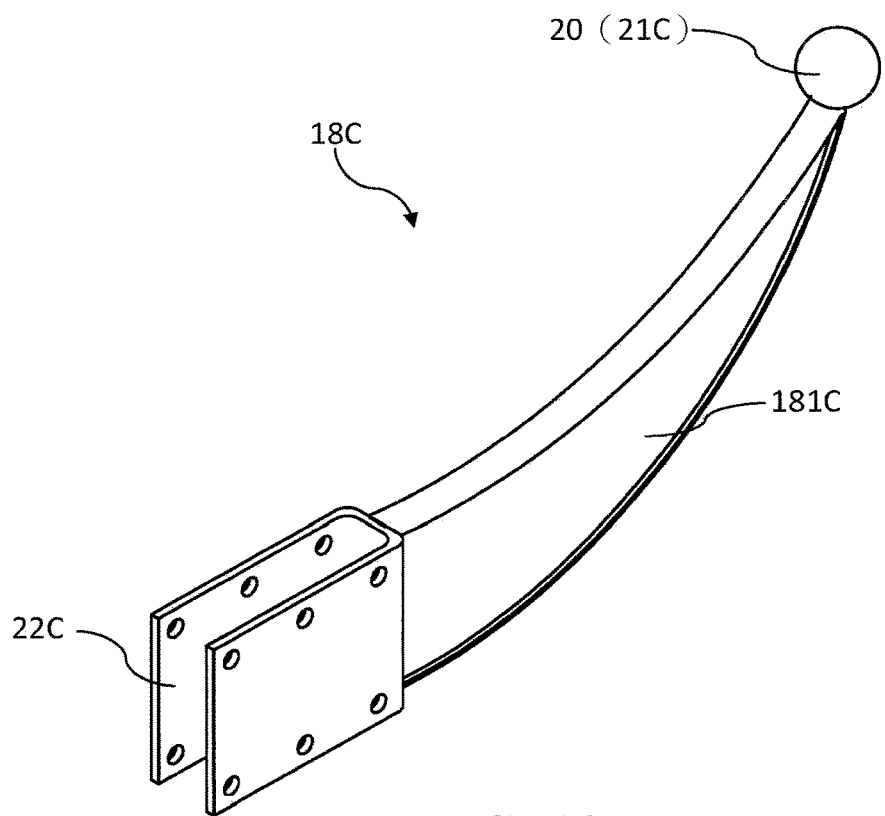
FIG. 13 is an axonometric view of a first detachable support according to a second embodiment of the present invention.
Figure 14:
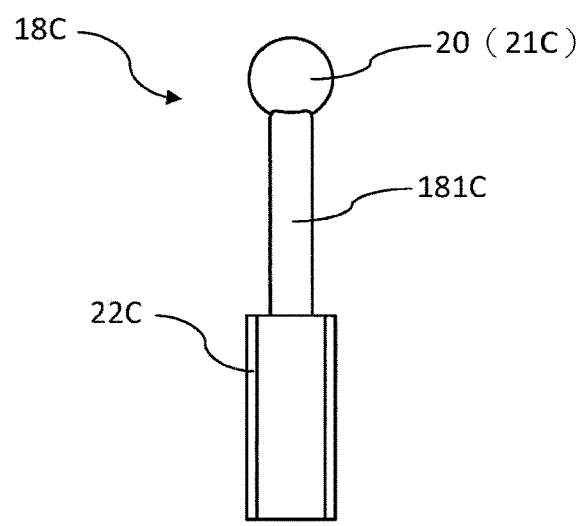
FIG. 14 is a front view of the first detachable support according to the second embodiment of the present invention.
Figure 15:
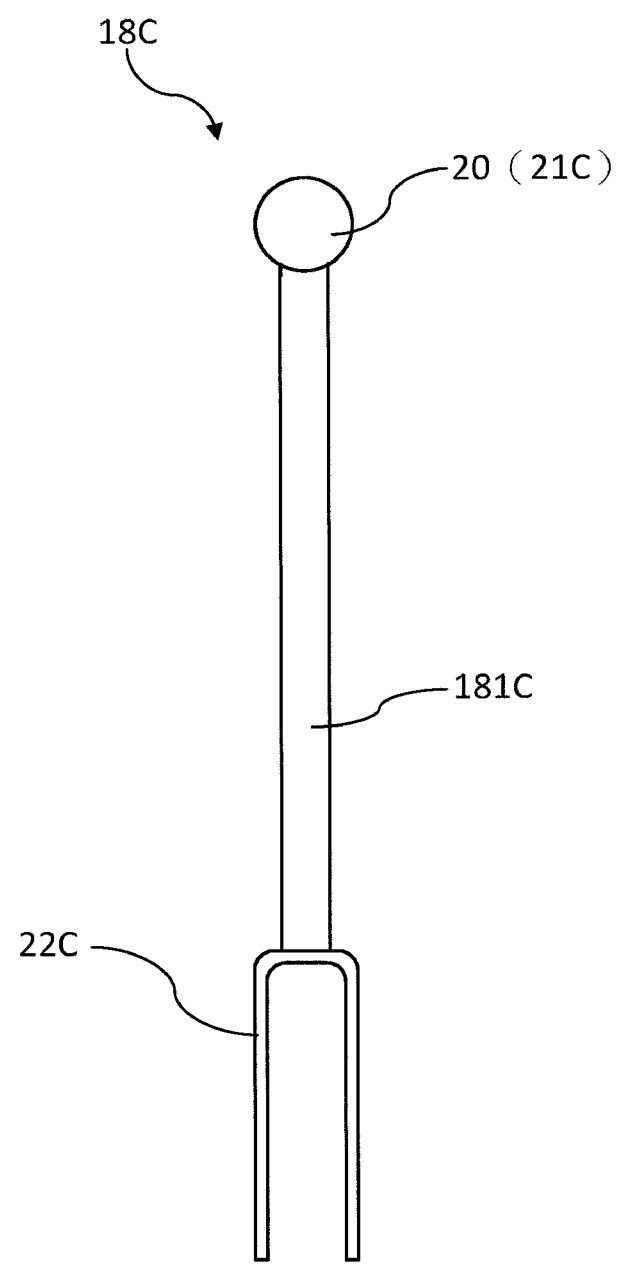
FIG. 15 is a top view of the first detachable support according to the second embodiment of the present invention.
Figure 16:
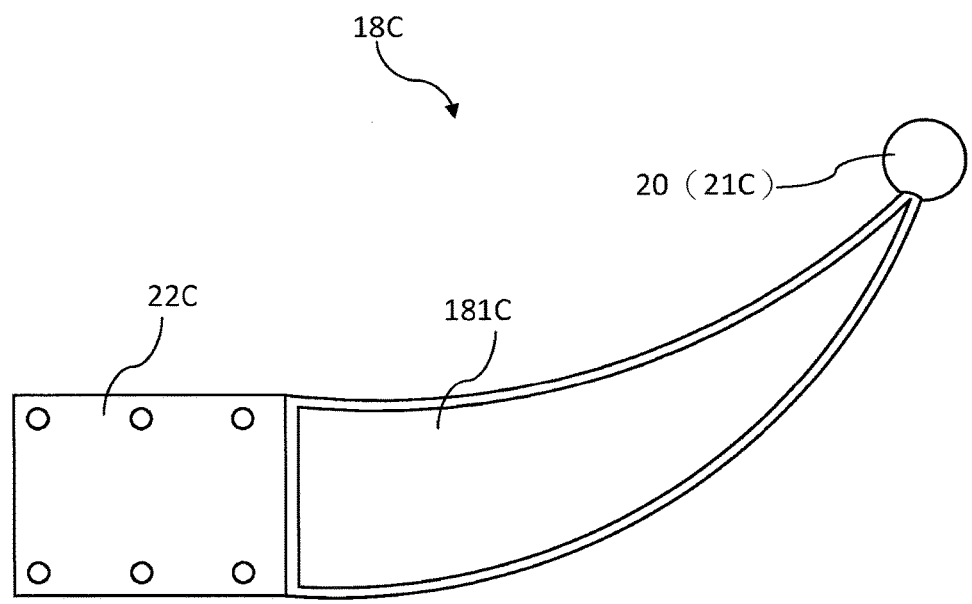
FIG. 16 is a right view of the first detachable support according to the second embodiment of the present invention.

Referring to FIG. 13, FIG. 14, FIG. 15, and FIG. 16, FIG. 13, FIG. 14, FIG. 15, and FIG. 16 are schematic diagrams of a first detachable support according to a second embodiment of the present invention. FIG. 13 is an axonometric view of the first detachable support according to this embodiment. FIG. 14 is a front view of the first detachable support according to this embodiment. FIG. 15 is a top view of the first detachable support according to this embodiment. FIG. 16 is a right view of the first detachable support according to this embodiment Similarities between this embodiment and the first embodiment are represented by same structures and component symbols, and details are not described herein again. Upon comparison between a first detachable support 18C in this embodiment and the first detachable support 18A in the first embodiment, it can be known that a length of a first body 181C of the first detachable support 18C of this embodiment is longer, and a design of the first base 22C of this embodiment is also different. The first base 22C of this embodiment is a U-shaped first base 22C, and is made of a slightly elastic and foldable material (such as rubber, plastic, or silicon), adapted to clamp a flat armrest strut and then fix the same by using a screw or an adjustable zip tie. Moreover, a structure of a second detachable support 18D is the same as that of the first detachable support 18C in this embodiment, and details are not described herein again.

Figure 17:
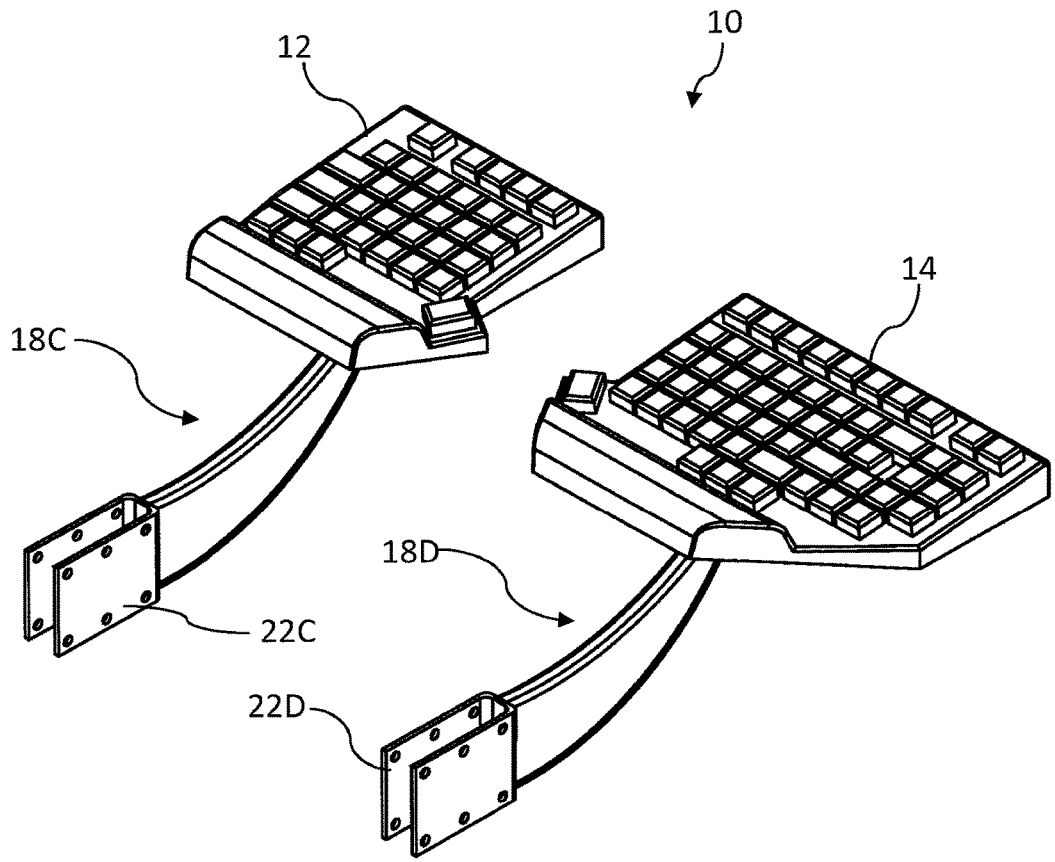
FIG. 17 is an axonometric view of a combination of a keyboard set, the first detachable support and a second detachable support according to the second embodiment of the present invention.
Figure 18:
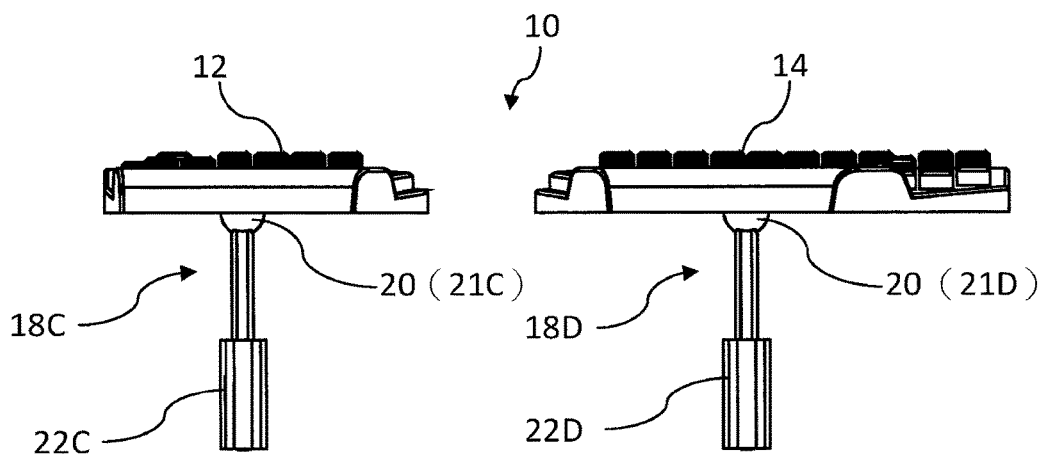
FIG. 18 is a front view of the combination of the keyboard set, the first detachable support and the second detachable support according to the second embodiment of the present invention.
Figure 19:
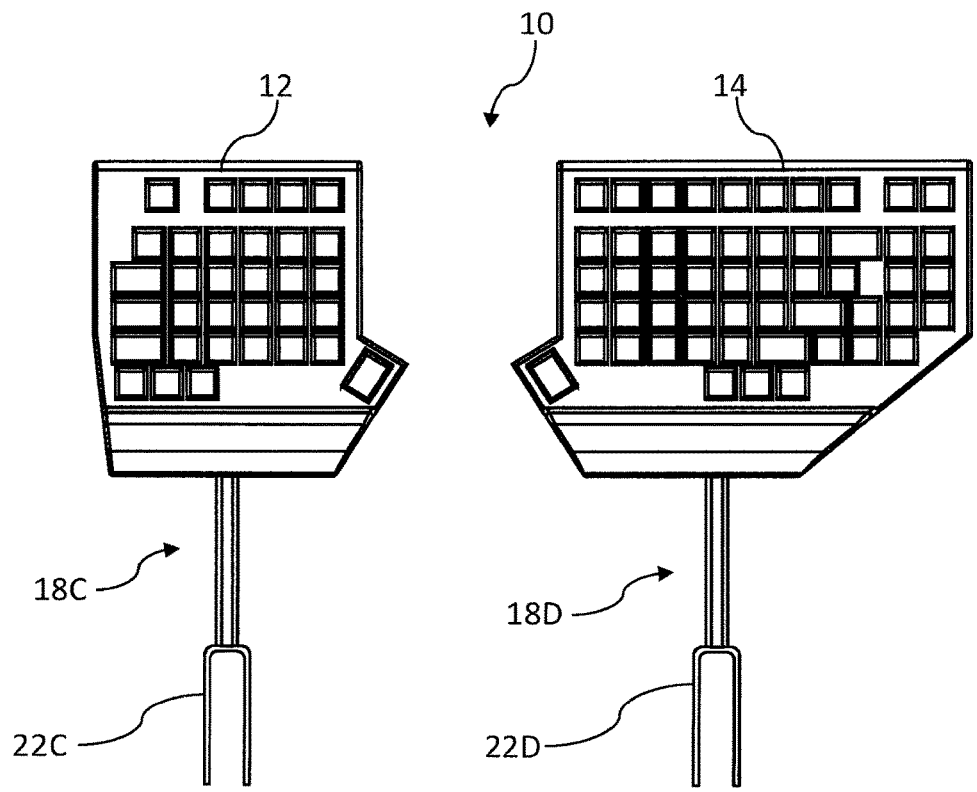
FIG. 19 is a top view of the combination of the keyboard set, the first detachable support and the second detachable support according to the second embodiment of the present invention.
Figure 20:
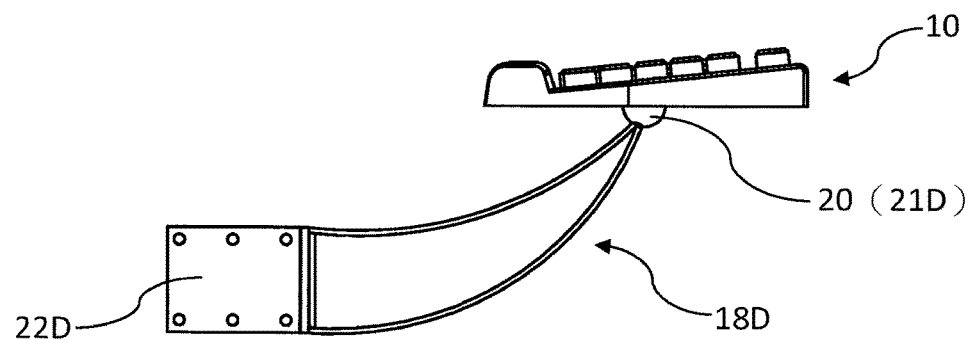
FIG. 20 is a right view of the combination of the keyboard set, the first detachable support and the second detachable support according to the second embodiment of the present invention.

Referring to FIG. 17, FIG. 18, FIG. 19, and FIG. 20, FIG. 17, FIG. 18, FIG. 19, and FIG. 20 are schematic diagrams of a combination of a keyboard set, the first detachable support, and the second detachable support according to the second embodiment of the present invention. FIG. 17 is an axonometric view of the combination of the keyboard set, the first detachable support, and the second detachable support. FIG. 18 is a front view of the combination of the keyboard set, the first detachable support, and the second detachable support. FIG. 19 is a top view of the combination of the keyboard set, the first detachable support, and the second detachable support. FIG. 20 is a right view of the combination of the keyboard set, the first detachable support, and the second detachable support. Statuses when a left keyboard 12 is used in combination with the first detachable support 18C and when a right keyboard 14 is used in combination with the second detachable support 18D can be seen from FIG. 17, FIG. 18, FIG. 19, and FIG. 20.

Figure 21:
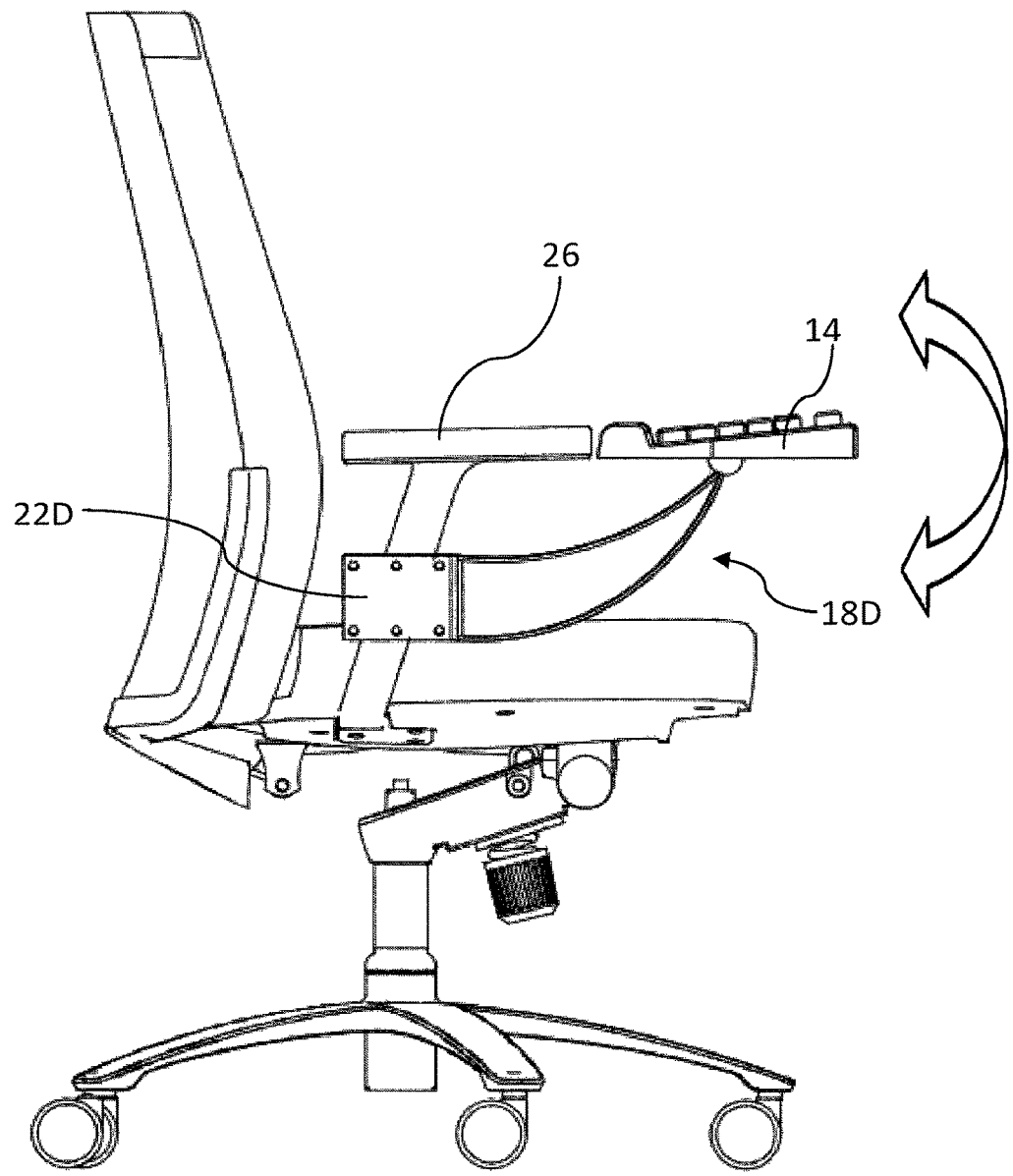
FIG. 21 is a right view of a combination of a right keyboard, the second detachable support, and a T-shaped armchair according to the second embodiment of the present invention.

Referring to FIG. 21, FIG. 21 is a right view of a combination of the keyboard set, the first detachable support, the second detachable support, and a T-shaped armchair according to the second embodiment of the present invention. The armchair in FIG. 21 is a general existing chair. FIG. 21 is merely intended to describe a relationship between this type of armrests and the present invention, and other components of the chair (such as a chair back, a chair surface, a pneumatic lifting device, or a wheel) are irrelevant to the present invention. FIG. 21 is not intended to limit a pattern, a proportion, and a shape of the armchair adapted to the present invention. An upright strut of such a T-shaped armrest 26 (i.e., a strut fixed by a base) is flat, and is adapted to be fixed by using the first base 22C of the first detachable support 18C or the second base 22D of the second detachable support 18D of this embodiment (as shown in FIG. 17). FIG. 21 is a right view, and therefore, only a schematic diagram of a combination of the right keyboard 14, the second base 22D of the second detachable support 18D, and the T-shaped armrest 26 of the chair is seen. A manner of fixing the second base 22D of this embodiment is locking by using a screw or a nut by means of a through hole provided on the U-shaped second base 22D, or locking by using an adjustable zip tie, so that the U-shaped second base 22D clamps the upright strut of the T-shaped armrest 26.

Description is made by using the first embodiment and the second embodiment of FIG. 12 or FIG. 21. When a user operates the right keyboard 14 of the foregoing two embodiments to be placed on the armrest, an upper part of a body does not need to lean forward to approach to the keyboard set on the desktop, and therefore, the body may comfortably lean against the chair back, and an atm is comforably placed on the armrest, so as to avoid a poor posture that the arm is suspended or half-suspended. Even though the user needs to operate the right keyboard 14 for long working hours, because the body leans against the chair back, a forearm is supported by the armrest, and the palm is supported by the palm support area 16, fatigue to the shoulder, neck, arm, and wrist caused by working for a long time can be effectively reduced, and even damages caused by a poor posture can be avoided. Because FIG. 12 and FIG. 21 only show the right keyboard 14, only an actuation mode of the right keyboard 14 is described herein. Because the left keyboard 12 also has the same configuration as the right keyboard 14, the left keyboard 12 can also achieve the same function, and details are not provided herein again.

The keyboard set 10 of the foregoing embodiments of the present invention uses the multidirectional angle adjusting mechanism (i.e., the foregoing spherical joint set includes a combination of the spherical ball member 20 and the hemi-spherical receptacle) to support a multidirectional angle adjustment. The "multidirectional" includes at least three angle adjustments related to the ergonomics (also referred to as human factors engineering) (i.e., a posture when the user operates the keyboard): an adjustment to an angle of the wrist, an adjustment to an included angle between two palms, and an adjustment to an included angle between an outer side of a palm and the ground.

The adjustment to the angle of the wrist is vertically adjusting a degree of inclination of the keyboard set 10 (i.e., the angle of the wrist) by using the spherical ball member 20 as a center point, as shown by the symbols of double-headed arrows in FIG. 12 and FIG. 21. FIG. 12 shows that a front end of the right keyboard 14 (the right side in the figure) declines slightly, and FIG. 21 shows that the right keyboard 14 and the armrest are kept on the same horizontal plane.

Figure 22:
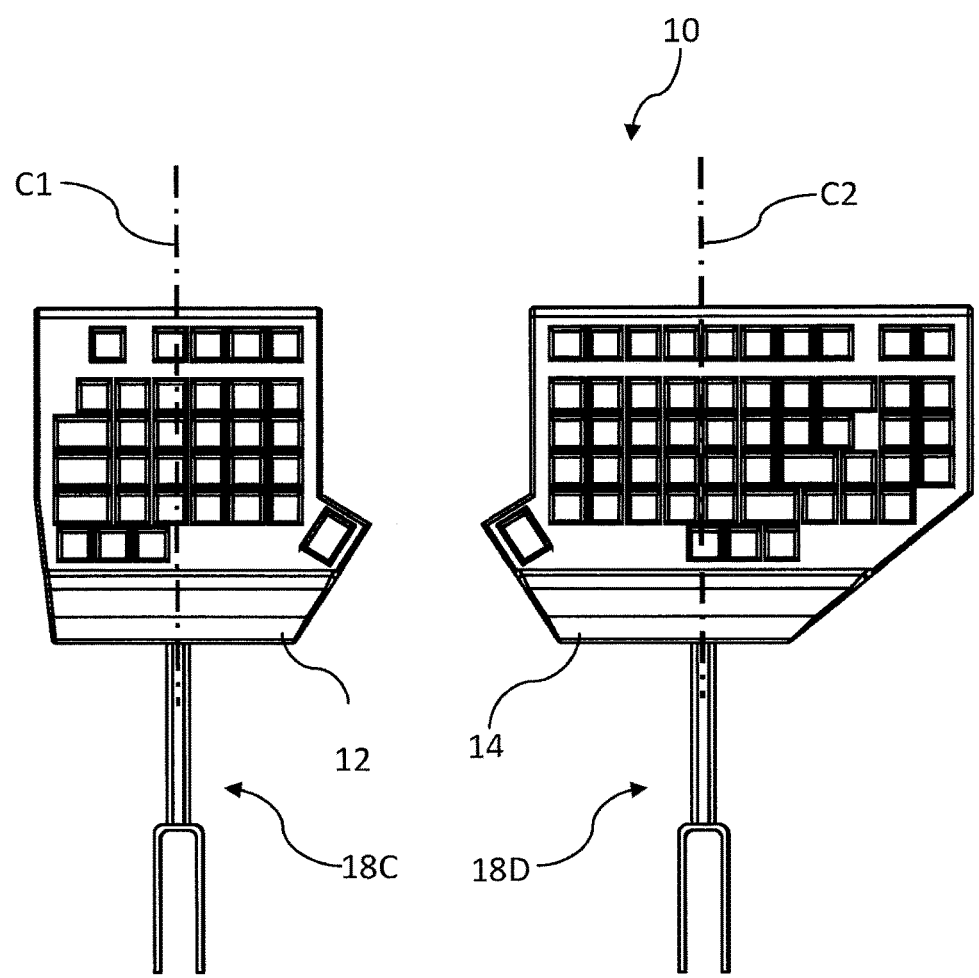
FIG. 22 is a schematic diagram of adjustment of an included angle between two palms of the keyboard set according to the second embodiment of the present invention.
Figure 23:
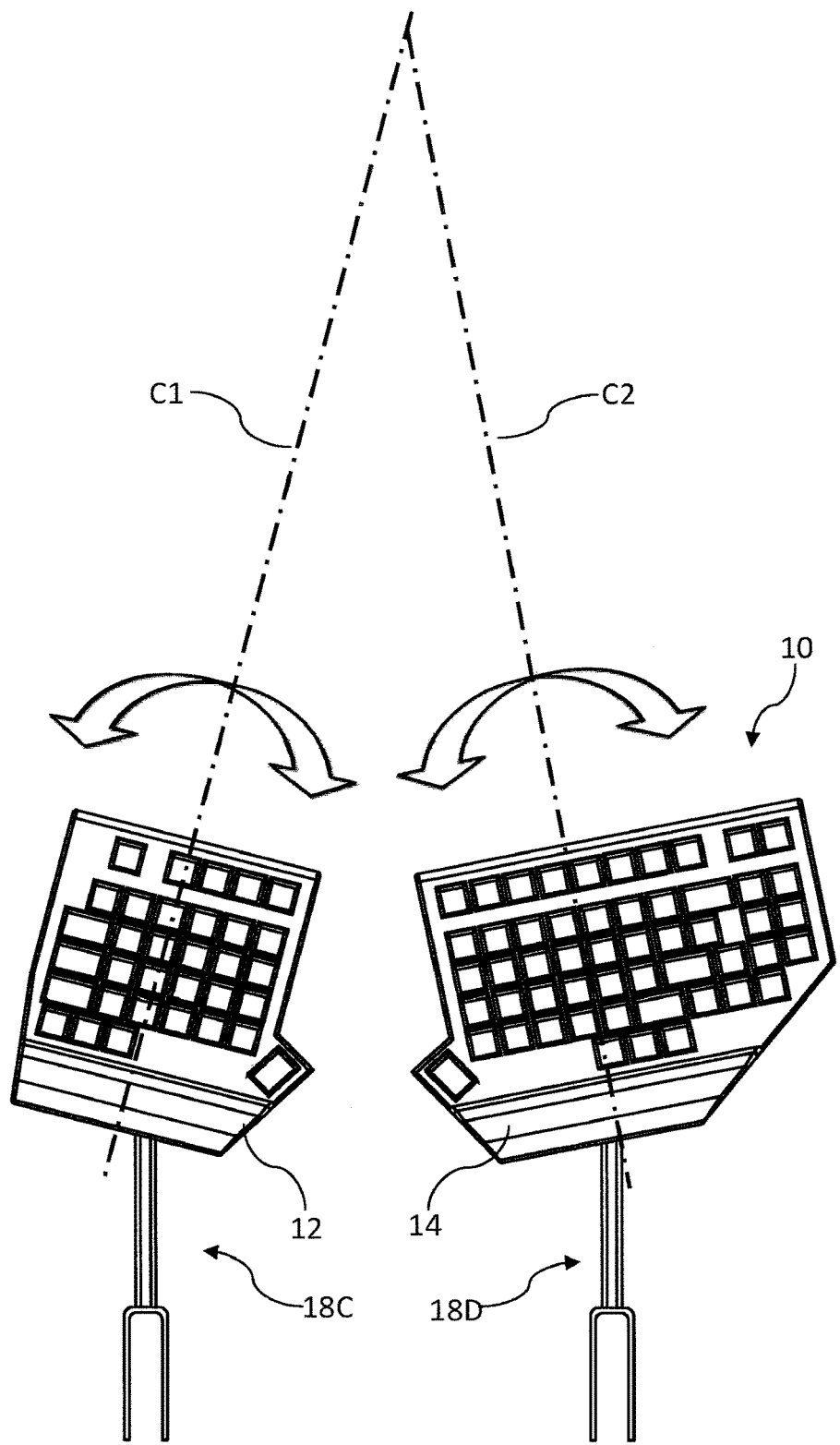
FIG. 23 is a schematic diagram of adjustment of the included angle between two palms of the keyboard set according to the second embodiment of the present invention.

The adjustment to the included angle between the two palms is an adjustment to an included angle between the left keyboard 12 and the right keyboard 14. If a straight line extending forward is drawn at each of centers of the two palms (respectively representing the left keyboard 12 and the right keyboard 14), when positions of the two palms incline inward, the two straight lines extending forward intersect to form an included angle, i.e., the included angle between the two palms. Generally, a shorter distance between the left keyboard 12 and the right keyboard 14 (for example, the left keyboard 12 and the right keyboard 14 are placed on the desktop) indicates a greater included angle generated between the two palms; and when a greater distance between the left keyboard 12 and the right keyboard 14 (for example, the left keyboard 12 and the right keyboard 14 are placed on the armrests) indicates a smaller included angle generated between the two palms or that the palms are even parallel, thereby being a comfortable posture satisfying the ergonomics. Referring to FIG. 22 and FIG. 23, FIG. 22 and FIG. 23 are schematic diagrams of adjustment of an included angle between two palms of the keyboard set according to the second embodiment of the present invention. The figures make description by using a top view of the combination of the keyboard set 10, the first detachable support 18C, and the second detachable support 18D. FIG. 22 is equivalent to FIG. 19, and describes that the left keyboard 12 and the right keyboard 14 are parallel. As shown in the figure, a virtual center line C1 passing through the left keyboard 12 and a virtual center line C2 passing through the right keyboard 14 are two straight lines that extend forward and do not intersect. FIG. 23 describes that the left keyboard 12 and the right keyboard 14 incline inward after the included angle between the two palms is adjusted. In this way, the virtual center line C1 of the left keyboard 12 and the virtual center line C2 of the right keyboard 14 intersect at a remote position.

Figure 24:
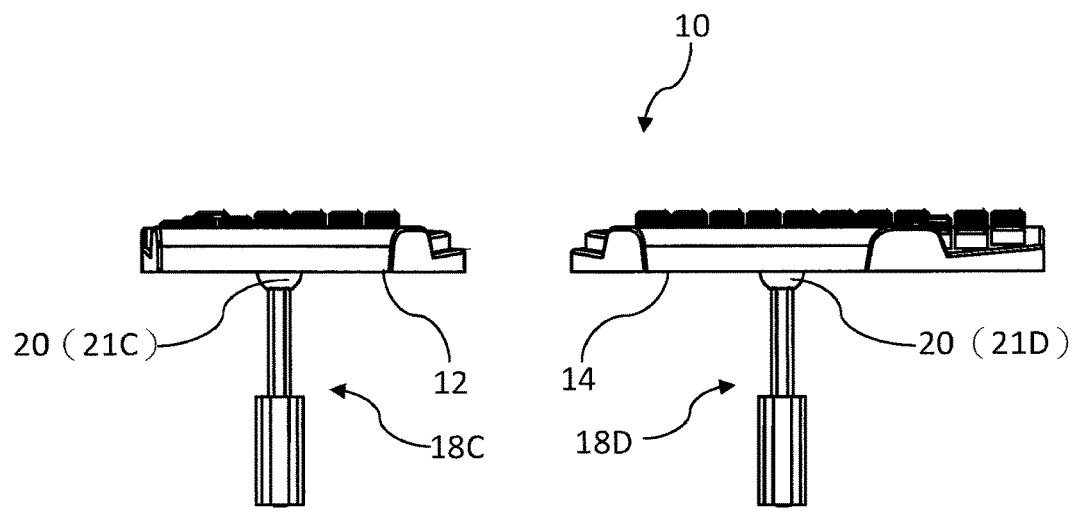
FIG. 24 is a schematic diagram of adjustment of an included angle between an outer side of a palm and a ground of the keyboard set according to the second embodiment of the present invention.
Figure 25:
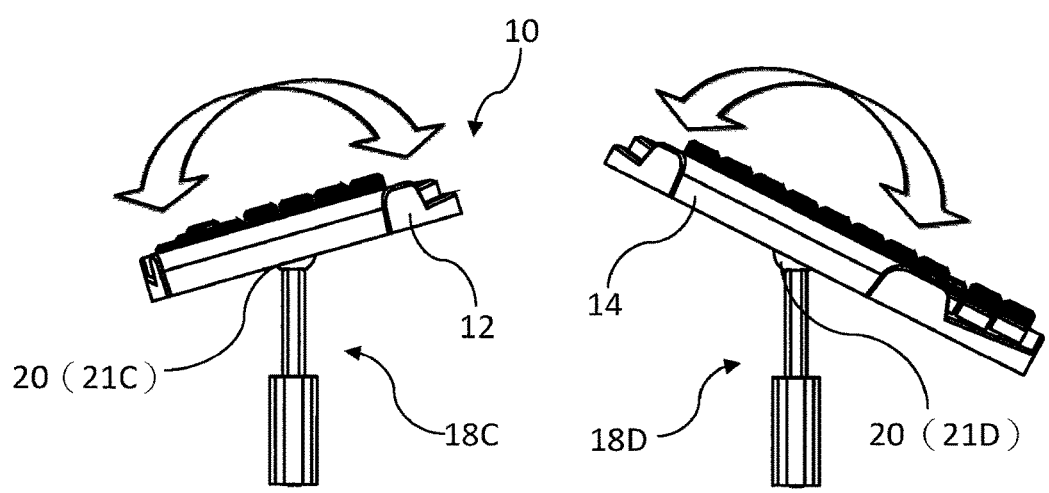
FIG. 25 is a schematic diagram of adjustment of an included angle between an outer side of a palm and a ground of the keyboard set according to the second embodiment of the present invention.

Referring to FIG. 24 and FIG. 25, FIG. 24 and FIG. 25 are schematic diagrams of adjustment of an included angle between an outer side of a palm and a ground of the keyboard according to the second embodiment of the present invention. The figures make description by using a front view of the combination of the keyboard set 10, the first detachable support 18C, and the second detachable support 18D. The adjustment to the included angle between the outer side of a palm and the ground is an adjustment to included angles between outer sides of the left keyboard 12 and the right keyboard 14 and the ground, where the outer side of a left palm is the left of the left keyboard 12, and the outer side of a right palm is the right of the right keyboard 14. When the keyboard set 10 is used on the desktop, the left keyboard 12 and the right keyboard 14 are parallel to the ground (that is, there is no included angle between the outer side of the palm and the ground). Generally, the comfortable posture satisfying the ergonomics needs to generate an included angle between the outer side of the palm and the ground. Therefore, when the keyboard set 10 is used on the armrests, the spherical ball member 20 of the first detachable support 18C or the second detachable support 18D may be used as a center point, so as to adjust the included angle between the outer side of the palm and the ground. FIG. 24 is equivalent to FIG. 17, and describes that both the left keyboard 12 and the right keyboard 14 are parallel to the ground (that is, there is no included angle between the outer side of the palm and the ground). FIG. 25 describes that both the left keyboard 12 and the right keyboard 14 incline outwards after being adjusted.

Figure 26:
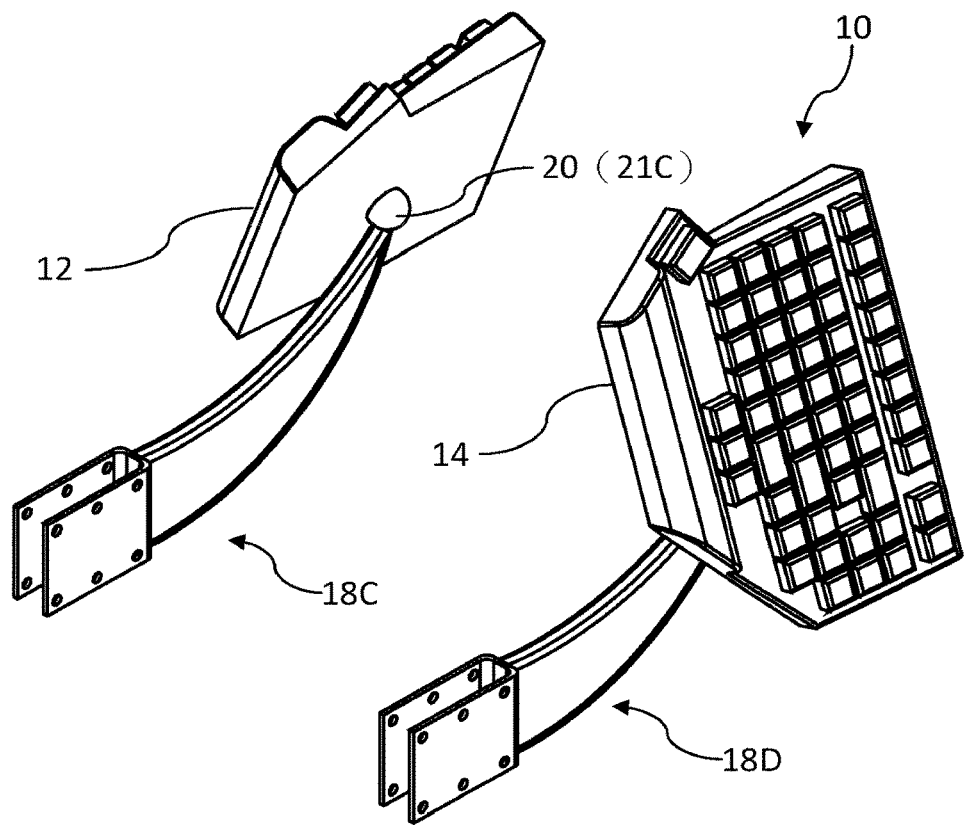
FIG. 26 is an axonometric view of the combination of the keyboard set, the first detachable support, and the second detachable support according to the second embodiment of the present invention.
Figure 27:
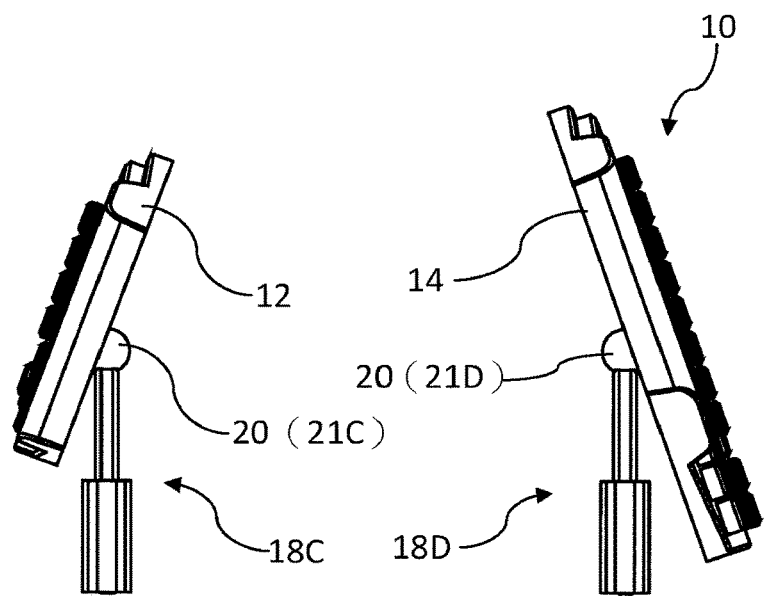
FIG. 27 is a front view of the combination of the keyboard set, the first detachable support, and the second detachable support according to the second embodiment of the present invention.

When the user adjusts the forgoing included angle between the outer side of the palm and the ground to a maximum angle, at the moment, the keyboard set 10 is nearly upright. However, due to a limitation to a position at which the spherical ball member 20 is linked to the first detachable support 18C or the second detachable support 18D, the keyboard set 10 cannot be actually upright to be "perpendicular" to the ground. This adjustment state is adapted to be used when the user stands up from an armchair or sits into the armchair, so as to prevent an access from being blocked. Referring to FIG. 26 and FIG. 27, FIG. 26 and FIG. 27 are upright schematic diagrams at different angles of view of the keyboard according to the second embodiment of the present invention. FIG. 26 is an axonometric view of the combination of the keyboard set, the first detachable support and the second detachable support. FIG. 27 is a front view of the combination of the keyboard set, the first detachable support and the second detachable support. Herein, in order to save drawing space, FIG. 26 and FIG. 27 do not show a distance between the left keyboard 12 and the right keyboard 14 according to an actual proportion. Therefore, the figures may generate an illusion that space for an access is narrow.

Figure 28:
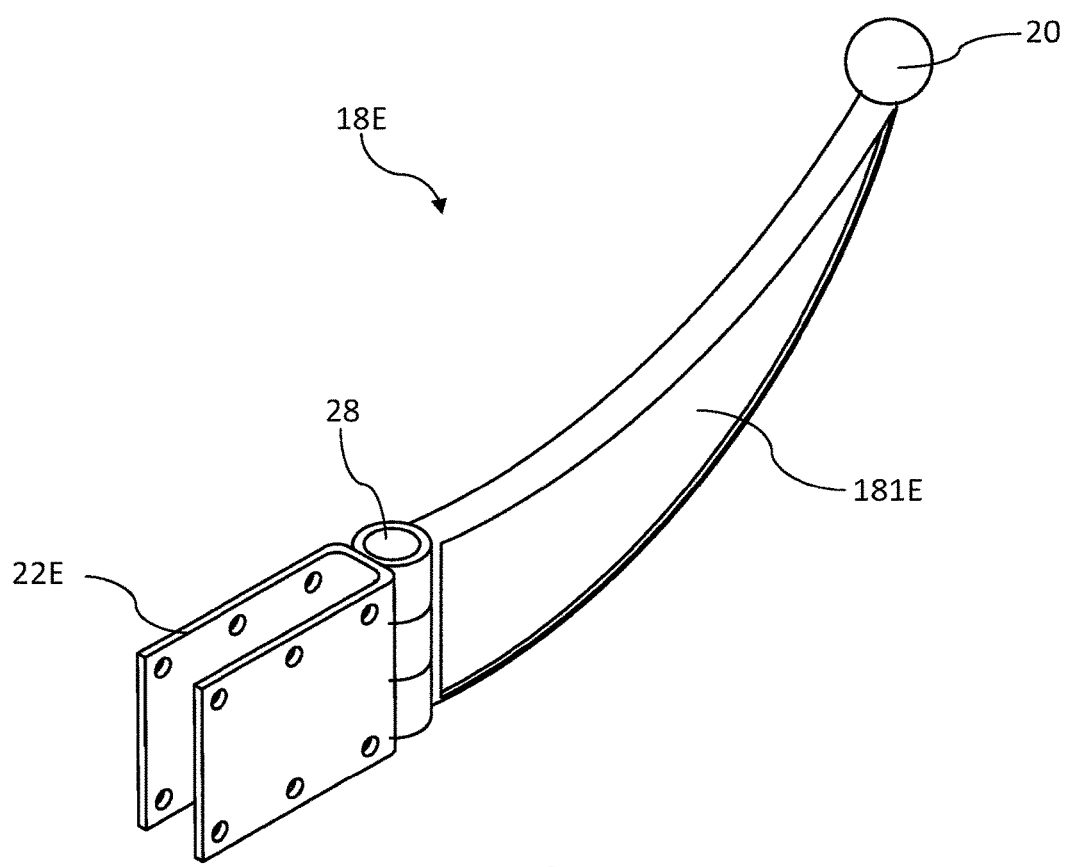
FIG. 28 is an axonometric view of a first detachable support according to a third embodiment of the present invention.
Figure 29:
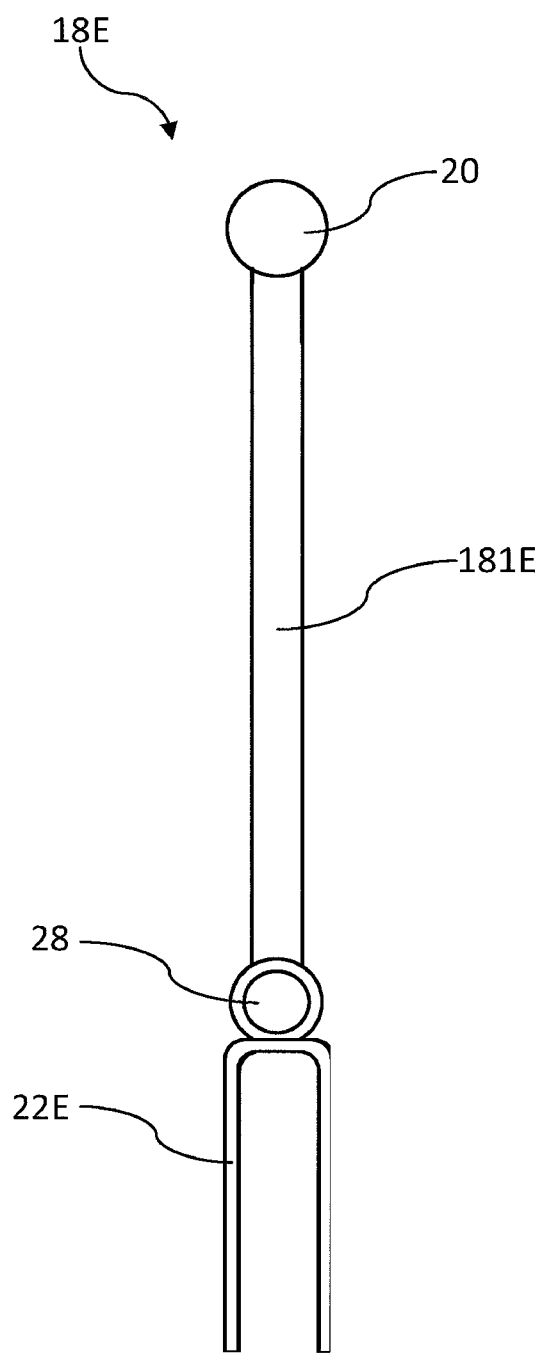
FIG. 29 is a top view of the first detachable support according to the third embodiment of the present invention.

Referring to FIG. 28 and FIG. 29, FIG. 28 and FIG. 29 are respectively an axonometric view and a top view of a first detachable support according to a third embodiment of the present invention. In addition to that "the included angle between the outer side of the palm and the ground" in the foregoing embodiment of the present invention can be adjusted to a maximum angle to facilitate an access of a user, further, in the third embodiment of the present invention, a pivoting member 28 is added into a first detachable support 18E. The pivoting member 28 is connected to a first body 181E and a first base 22E. When the user enters or exits, the user can rotate the first detachable support 18E outwards, so as to facilitate the access. The same structure may also be applied between a second detachable support and a right keyboard 14, and details are not provided herein again.

Figure 30:
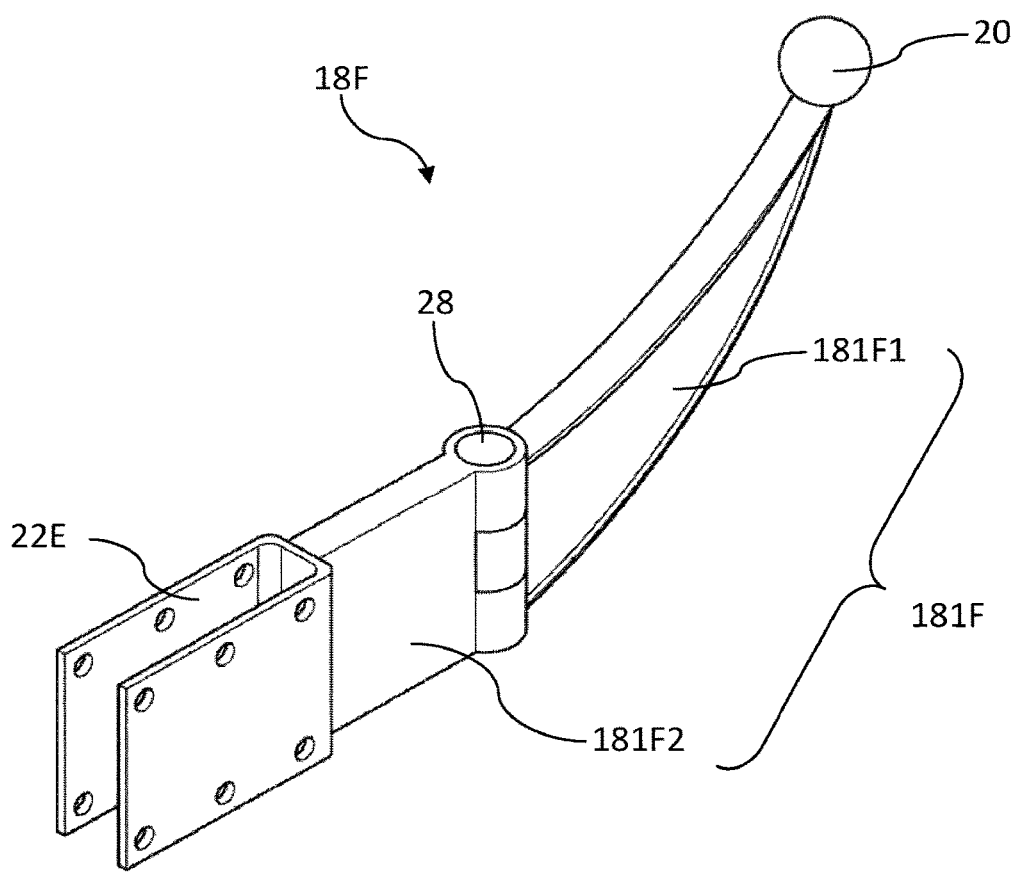
FIG. 30 is an axonometric view of a first detachable support according to a fourth embodiment of the present invention.

Referring to FIG. 30, FIG. 30 is an axonometric view of a first detachable support 18F according to a fourth embodiment of the present invention. Similarities between a part of the structure of this embodiment and the third embodiment are represented by same component symbols, and details are not described herein again. A difference between the first detachable support 18F of this embodiment and the first detachable support 18E of the third embodiment is that the pivoting member 28 is provided in the middle of a first body 181F, so that the first body 181F is divided into a front section 181F1 and a rear section 181F2. The same structure may also be applied to a second detachable support, and details are not provided herein again. In this way, the rear section 181F2 connected to the first base 22E is fixed with the first base 22E, and the front section 181F1 connected to the spherical ball member 20 may rotate outwards.

Figure 31:
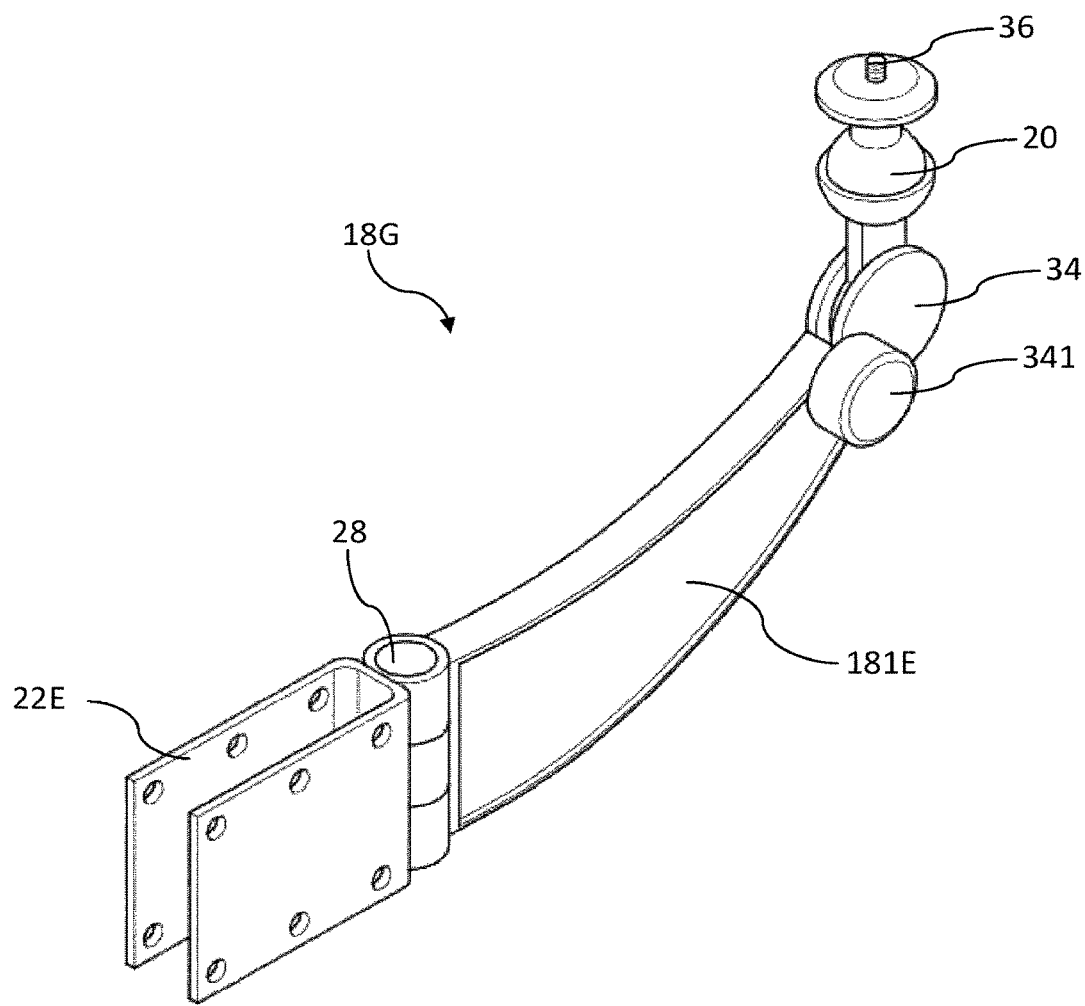
FIG. 31 is an axonometric view of a first detachable support according to a fifth embodiment of the present invention.

Referring to FIG. 31, FIG. 31 is an axonometric view of a first detachable support 18G according to a fifth embodiment of the present invention. A difference between the first detachable support 18G of this embodiment and the first detachable support 18E of the third embodiment is that an adjustment structure 34 is added between a spherical ball member 20 and a pivoting member 28. During adjustment, an angle for inclining forward or backward may be adjusted by unscrewing a screw 341 of the adjustment structure 34, and then fixing is performed by screwing the screw 341. In addition, in this embodiment, a fixing screw 36 is further connected on a front end of the spherical ball member 20, and a corresponding screw hole (not shown) may be provided on a bottom portion of a left keyboard 12, to serve as a link mechanism. That is, the first link mechanism is the screw hole, and the third link mechanism is the fixing screw 36. When the left keyboard needs to be fixed to the first detachable support 18G, the fixing screw 36 corresponding to the screw hole of the left keyboard may be screwed in, so that the left keyboard is fixed to the first detachable support 18G. The same structure may also be applied between a second detachable support and a right keyboard, and details are not provided herein again.

Figure 32:
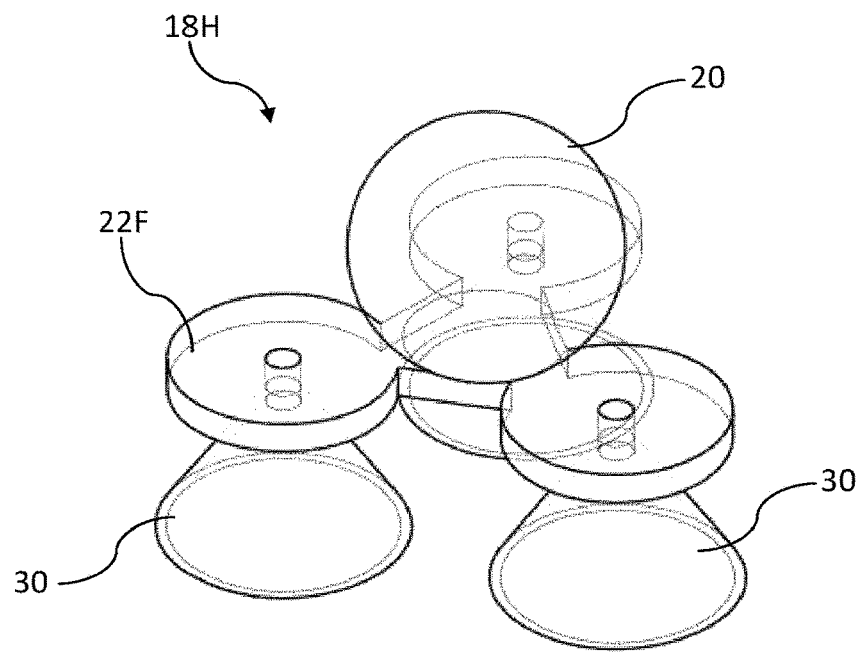
FIG. 32 is an axonometric view of a first detachable support according to a sixth embodiment of the present invention.
Figure 33:
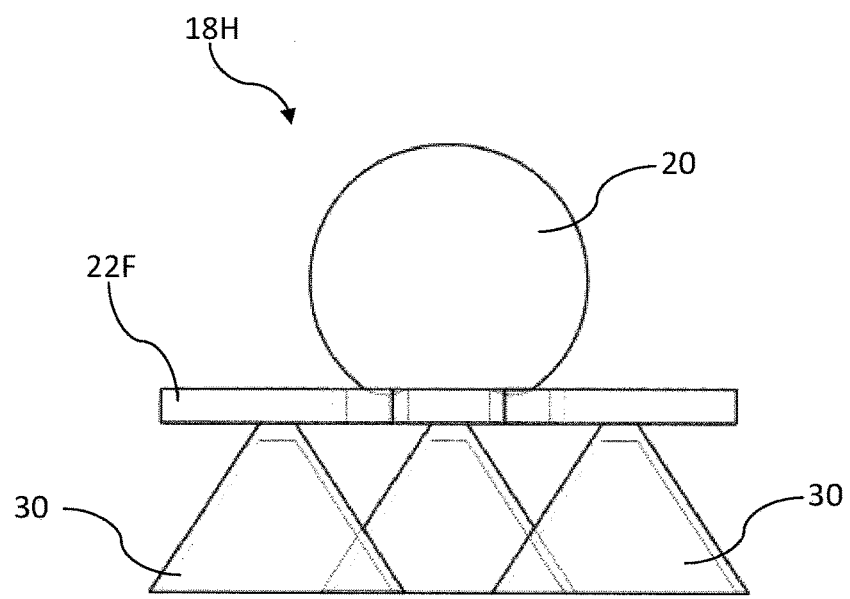
FIG. 33 is a front view of the first detachable support according to the sixth embodiment of the present invention.

Referring to FIG. 32 and FIG. 33, FIG. 32 and FIG. 33 are respectively an axonometric view and a front view of a detachable support 18H according to a sixth embodiment of the present invention. For ease of describing this embodiment, the figures are magnified to be shown (i.e., the proportion is different from the foregoing figures), and are presented in a manner of drawing perspective drawings with dotted lines to describe a component of a sucker 30. The first detachable support 18H of this embodiment includes a first base 22F and three suckers 30. An accommodation groove is provided above the first base 22F, and a spherical ball member 20 is directly embedded into the accommodation groove. The three suckers 30 are connected below the first base 22F, so that the first base 22F is fixed on an armrest in a sucking manner. When the armrest is long and wide enough (for example: an armrest of a single sofa, or an armrest of a massage chair), and a surface of the armrest is smooth, the suckers 30 of this embodiment may be used to fix on the armrest. In some embodiments of the present invention, the first detachable support 18H uses different quantities of suckers 30, for example: one to multiple (not drawn). In some other embodiments of the present invention, below the first base 22F, the suckers 30 may be replaced with a hook-and-loop (or Velcro, not drawn), so that the first base 22F is fixed on the armrest of which the surface is not smooth.

Figure 34:
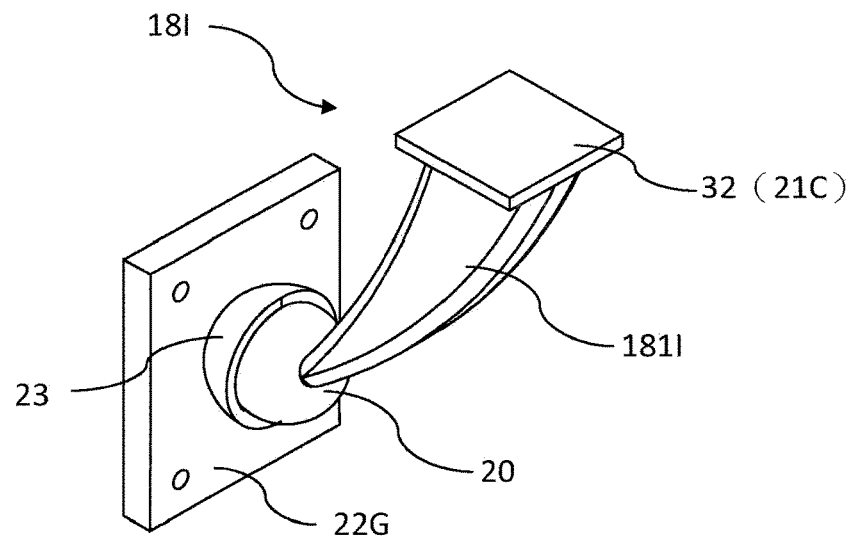
FIG. 34 is an axonometric view of a first detachable support according to a seventh embodiment of the present invention.
Figure 35:
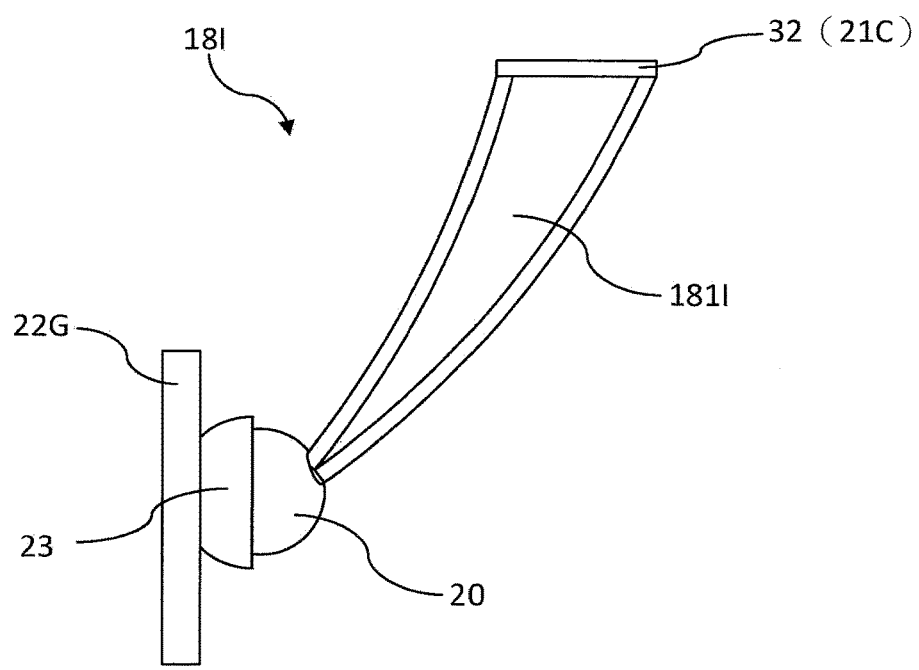
FIG. 35 is a right view of the first detachable support according to the seventh embodiment of the present invention.

In all the foregoing embodiments, the spherical ball member 20 and the hemi-spherical receptacle are used as the link mechanism between the keyboard set 10 and the first and second detachable supports, as well as the multidirectional angle adjusting mechanism. In some other embodiments of the present invention, a hook-and-loop (not drawn) or a magnet combination may be used as the link mechanism. Referring to FIG. 34 and FIG. 35, FIG. 34 and FIG. 35 are respectively an axonometric view and a right view of a first detachable support 18I according to a seventh embodiment of the present invention. In this embodiment, a magnet 32 is used as a third link mechanism 21C of the first detachable support 18I, so as to be combined with a first link mechanism (a magnet having a reverse magnetic property, or a magnetic metal) on a bottom portion of a left keyboard. Similarly, a second detachable support having the same structure may also be used at the same time, so that a fourth link mechanism (a magnet herein) of the second detachable support is combined with a second link mechanism (a magnet having a reverse magnetic property, or a magnetic metal herein) on a bottom portion of a right keyboard, and details are not provided herein again.

In addition, in this embodiment, the first detachable support 18I further includes a first body 181I and a first base 22G. A multidirectional angle adjusting mechanism is provided between the first detachable support 18I and the first base 22G, to support a multidirectional angle adjustment. The multidirectional angle adjusting mechanism also includes a spherical ball member 20 and a hemi-spherical receptacle 23. The spherical ball member 20 is correspondingly provided on one end, opposite to the third link mechanism 21C, of the first body 181I of the first detachable support 18I. The hemi-spherical receptacle 23 is provided on the first base 22G of the first detachable support 18I. The spherical ball member 20 of the first detachable support 18I is detachably and correspondingly provided in the hemi-spherical receptacle 23. Appearances and constructions of other embodiments, in which a hook-and-loop may be used as the link mechanism are similar to these of this embodiment, and therefore are not drawn separately. However, the magnet 32 in FIG. 34 and FIG. 35 is changed as a hook-and-loop, and the bottom portions of the left keyboard and the right keyboard are also provided with corresponding hook-and-loops capable of performing combination.

Figure 36:
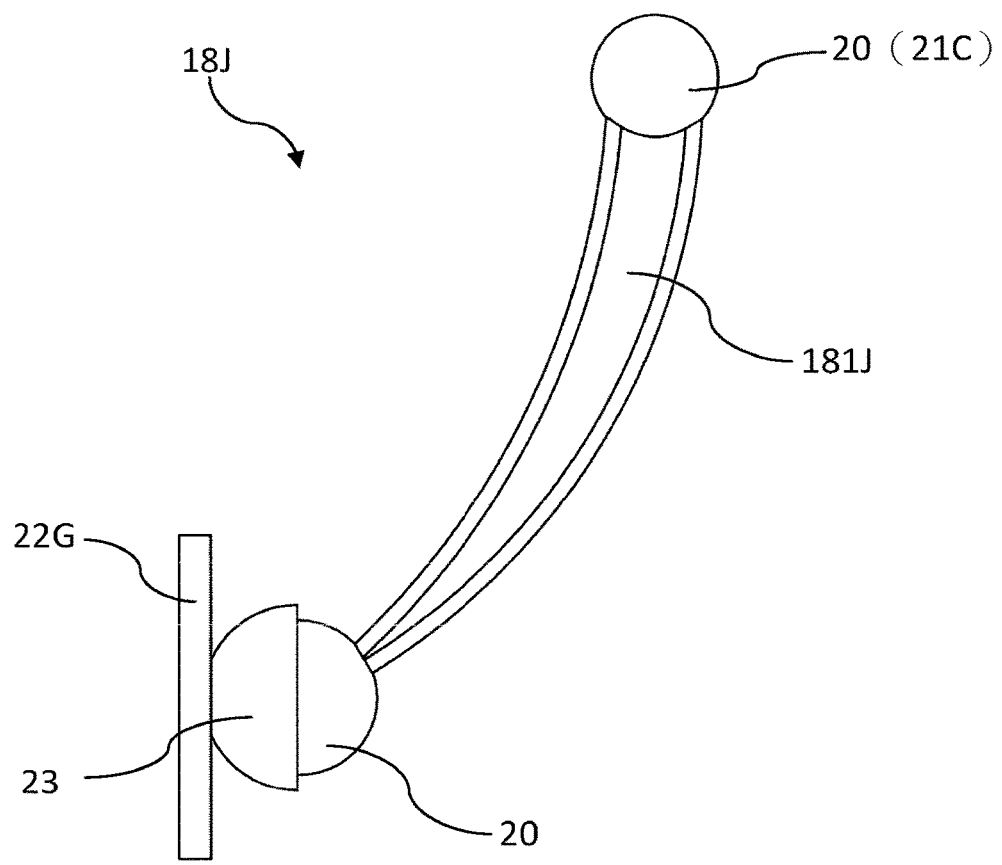
FIG. 36 is a right view of a first detachable support according to an eighth embodiment of the present invention.

In some embodiments of the present invention, two combinations of the spherical ball member 20 and the hemi-spherical receptacle may be used. One of the combinations is located on the base 22G and the other one is used as a link mechanism (that is, two "multidirectional angle adjusting mechanisms"), so as to support more flexible multidirectional angle adjustments. Referring to FIG. 36, FIG. 36 is a right view of a first detachable support 18J according to an eighth embodiment of the present invention. Similarities between a part of the structure of this embodiment and the seventh embodiment are represented by same component symbols, and details are not described herein again. A difference between this embodiment and the seventh embodiment lies in respect of a first body 181J, a first link mechanism, and a third link mechanism 21C. Regarding the first link mechanism and the third link mechanism 21C of this embodiment, the hemi-spherical receptacle shown in the first embodiment is used as the first link mechanism on a bottom portion of a left keyboard, and a spherical ball member 20 is used as the third link mechanism 21C of the first detachable support 18J, so as to be correspondingly and detachably combined. Moreover, with the difference of the third link mechanism 21C provided on the first body 181J, the first body 181J may is also adjusted accordingly. Similarly, a second detachable support having the same structure may also be used at the same time, so that a fourth link mechanism (a spherical ball member herein) of the second detachable support is combined with a second link mechanism (a hemi-spherical receptacle herein) on a bottom portion of a right keyboard, and details are not provided herein again.

Figure 37:
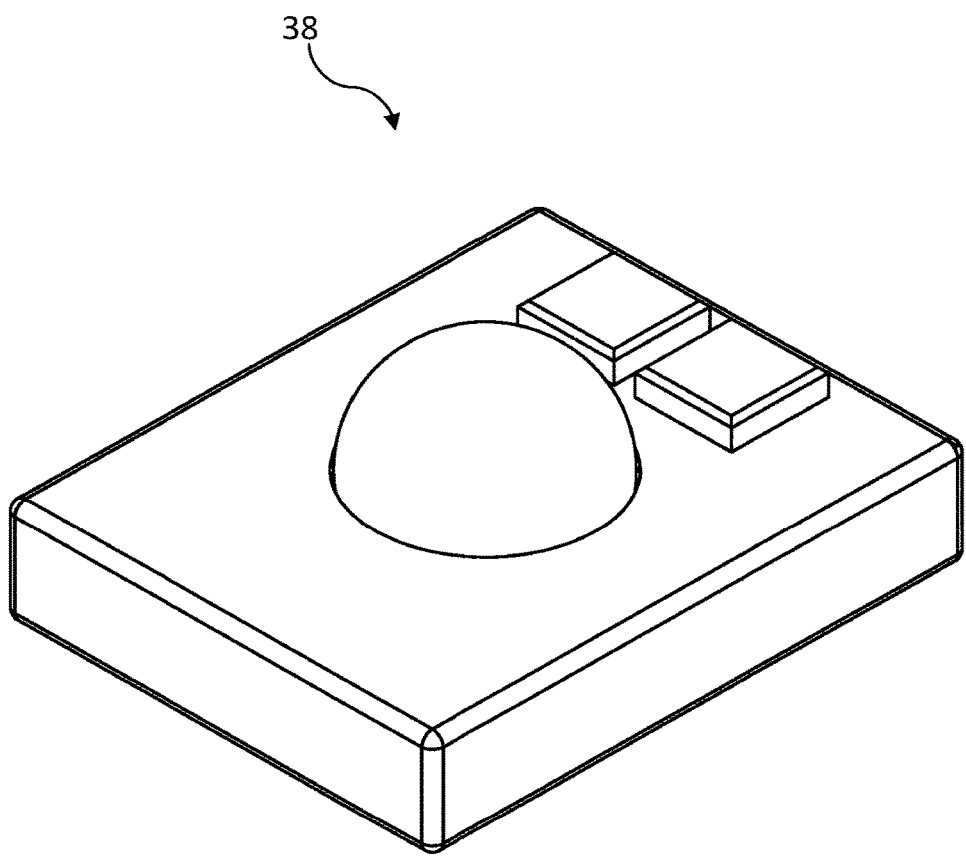
FIG. 37 is an axonometric view showing that an expansion device is a trackball according to an embodiment of the present invention.
Figure 38:
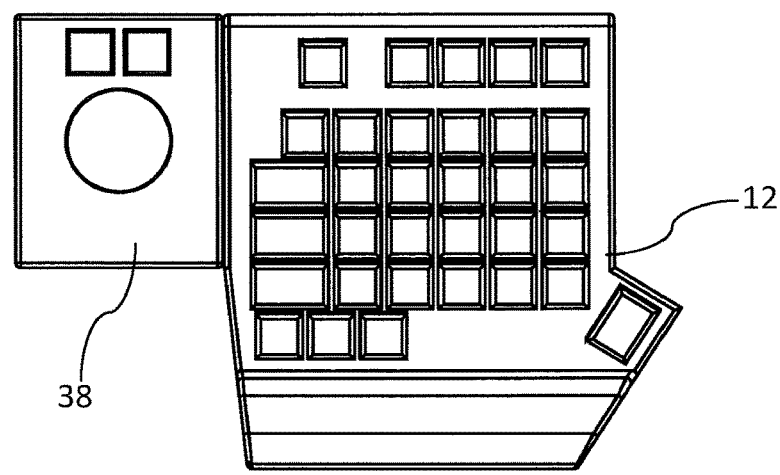
FIG. 38 is a top view showing that an expansion device is linked to the left of a left keyboard according to an embodiment of the present invention.
Figure 39:
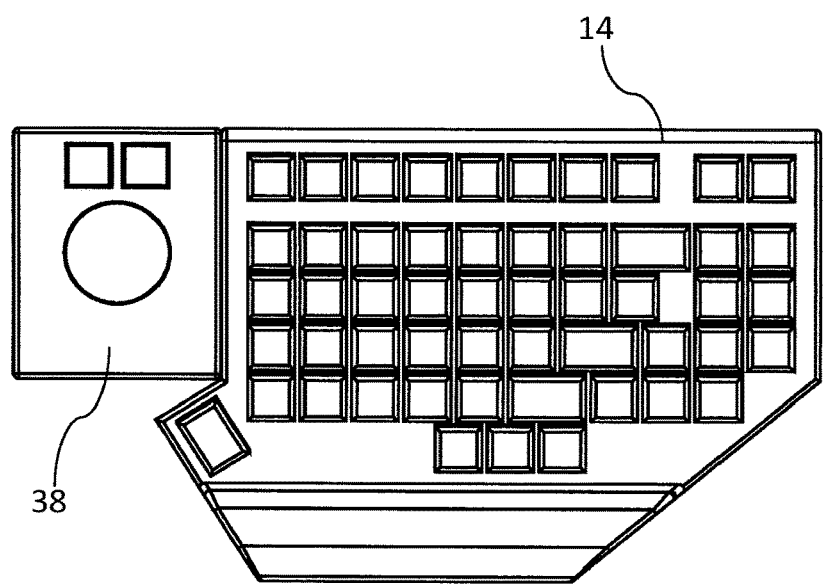
FIG. 39 is a top view showing that an expansion device is linked to the left of a right keyboard according to an embodiment of the present invention.
Figure 40:
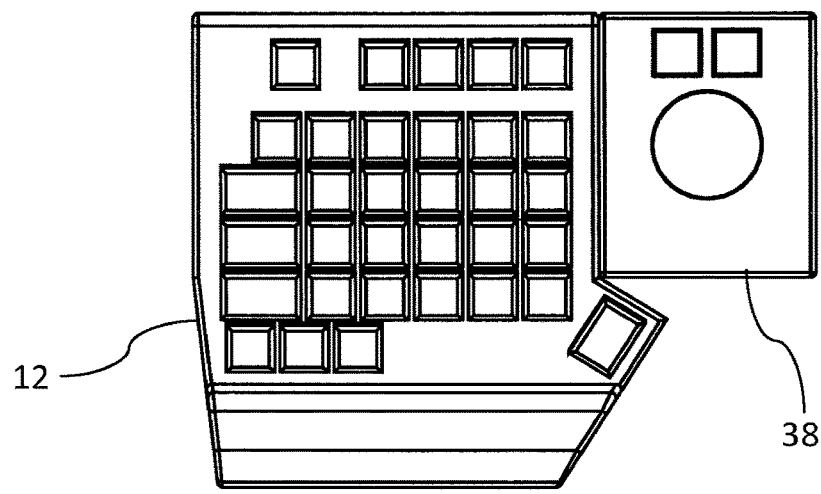
FIG. 40 is a top view showing that an expansion device is linked to the right of a left keyboard according to an embodiment of the present invention.
Figure 41:
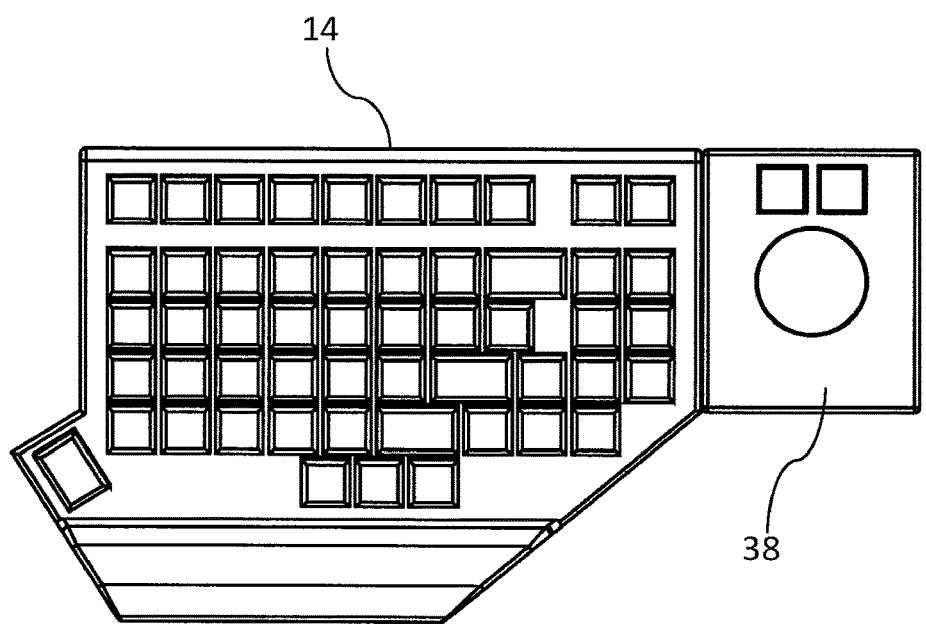
FIG. 41 is a top view showing that an expansion device is linked to the right of a right keyboard according to an embodiment of the present invention.

The keyboard set 10 of the foregoing embodiments of the present invention is expandable, and USB connectors (not drawn) are respectively built in the left keyboard 12 and the right keyboard 14, so that "detachable expansion devices", for example: an input or control type peripheral devices such as a trackball 38 (shown in FIG. 37), a joystick, a mouse, a touch panel, or a numeric keyboard may be externally connected by means of the USB connectors. The "detachable expansion device" has a USB connection cable configured to connect the USB connector of the left keyboard 12 or the right keyboard 14, so as to transmit data or/and supply power. In addition, the "detachable expansion device" may also has a quick-detachable tenon mechanism (not drawn), to be linked and fixed with a corresponding tenon mechanism (not drawn) on the left keyboard 12 or the right keyboard 14. For example, the tenon mechanism may be a match of an engagement member and an engagement groove. When the engaging member is provided on the keyboard, the engaging groove is provided on the detachable expansion device, or vice versa. The present invention is not limited thereto.

In some embodiments of the present invention, both left and right sides of the detachable expansion device are provided with tenon mechanisms; moreover, left and right sides of the left keyboard 12, and left and right sides of the right keyboard 14 are also provided with corresponding tenon mechanisms. That is, the user may randomly link the detachable expansion device to either the left side or the right side of the left keyboard 12 or the right keyboard 14 according to an own habit, as shown in FIG. 38 to FIG. 41.

Figure 42:
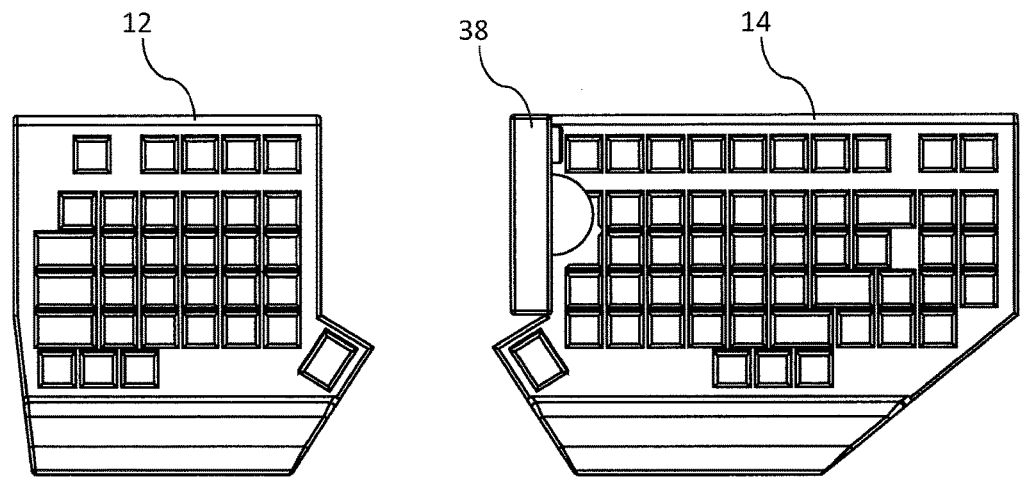
FIG. 42 is a top view showing that an expansion device is linked to the left of a right keyboard in an L shape according to an embodiment of the present invention.
Figure 43:
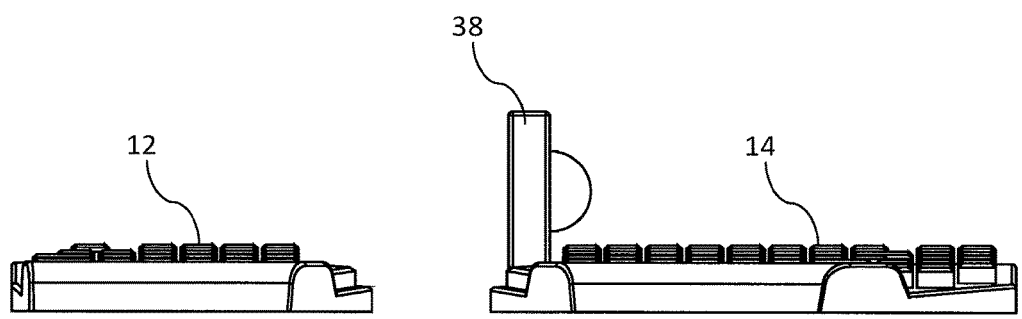
FIG. 43 is a front view showing that an expansion device is linked to the left of a right keyboard in an L shape according to an embodiment of the present invention.

In some embodiments of the present invention, only one side of the detachable expansion device is provided with a tenon mechanism (located on the left or right of the device, not drawn), which can be linked only to one side of the left keyboard 12 or the right keyboard 14. For example, the tenon mechanism is on the left of the detachable expansion device, and can be linked and fixed only to a corresponding tenon mechanism on the right of the left keyboard 12 or the right keyboard 14. In some other embodiments of the present invention, when the detachable expansion device is linked to an inner side of the left keyboard 12 or the right keyboard 14 (i.e., the right of the left keyboard 12, or the left of the right keyboard 14), one side of an L-shaped expansion member (an L-shaped member, where two sides of the L-shaped member that are perpendicular to each other are respectively provided with tenon structures) may be used to link the tenon mechanism of the detachable expansion device, and the other side may be used to link the tenon mechanism of the left keyboard 12 or the right keyboard 14 (not drawn). That is, the detachable expansion device is linked and fixed to the left keyboard 12 or the right keyboard 14 in an L-shaped manner (i.e., the detachable expansion device is linked to the left keyboard 12 or the right keyboard 14 in a perpendicular direction), as shown in FIG. 42 and FIG. 43.

In some embodiments of the present invention, the tenon mechanism is used to link or fix the detachable expansion device to the left keyboard 12 or right keyboard 14. In addition, an elongated reinforcement member (for example: a metal sheet, or a reinforced plastic sheet, not drawn) may be used to pass through the bottom portions of the detachable expansion device and the left keyboard 12 or the bottom portions of the detachable expansion device and the right keyboard 14, so as to enhance the link and support.

Figure 44:
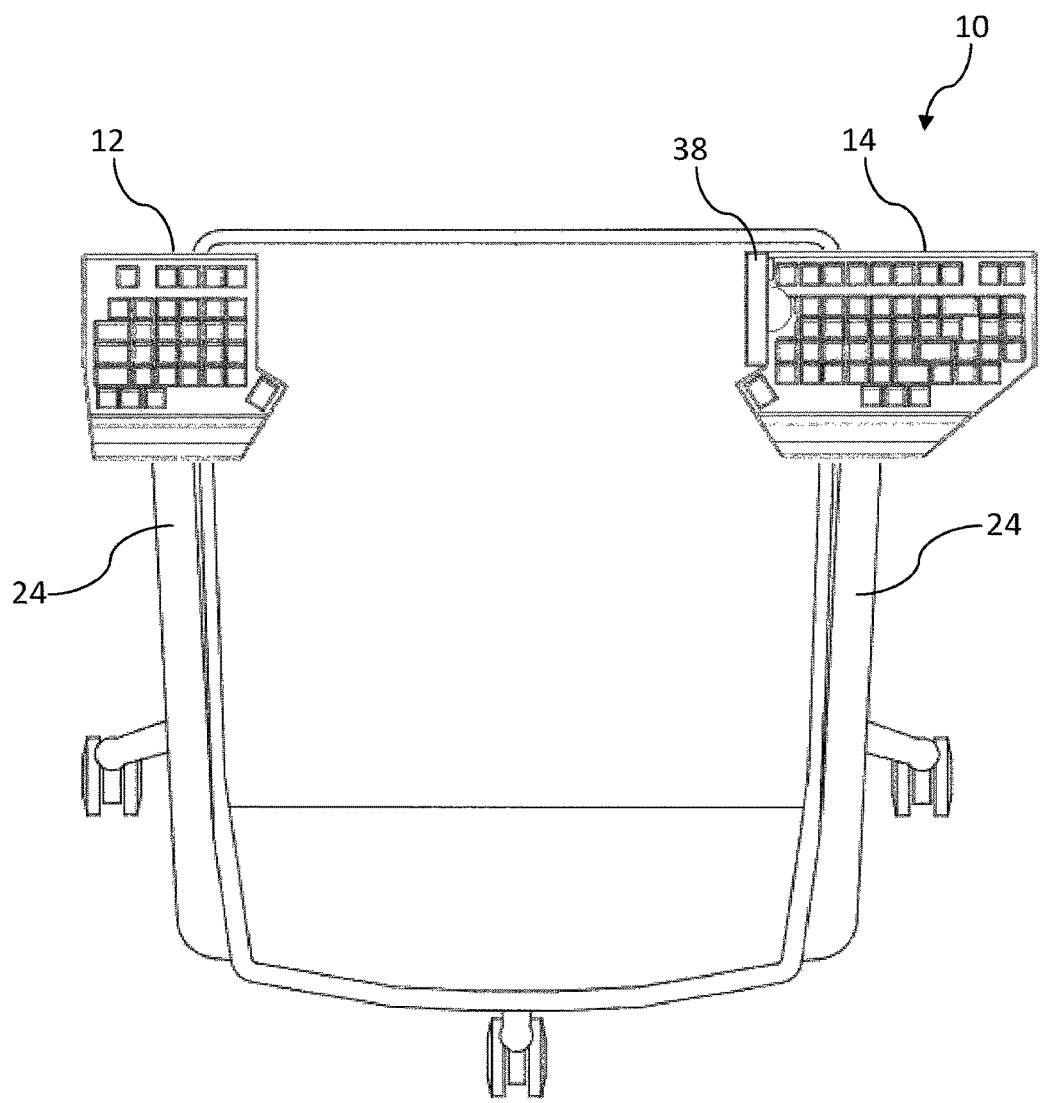
FIG. 44 is top view showing that a keyboard set and an expansion device are mounted on an inverted L-shaped armchair according to an embodiment of the present invention.

Referring to FIG. 44, FIG. 44 is a top view showing that the keyboard set 10, and the detachable expansion device, which is the trackball 38 herein are mounted on an inverted L-shaped armchair according to the first embodiment of the present invention. The first detachable support and the second detachable support are not shown due to an angle of the figure. Actually, the first detachable support 18A of the first embodiment is combined with the left keyboard 12, the second detachable support 18B is combined with the right keyboard 14, and the first detachable support 18A and the second detachable support 18B are respectively mounted on the inverted L-shaped armrests 24. As shown in FIG. 44, the expansion device, i.e., the trackball 38 is linked and fixed on the inner side of the right keyboard 14 (i.e., the left of the right keyboard 14) in an L-shaped manner.

Figure 45:
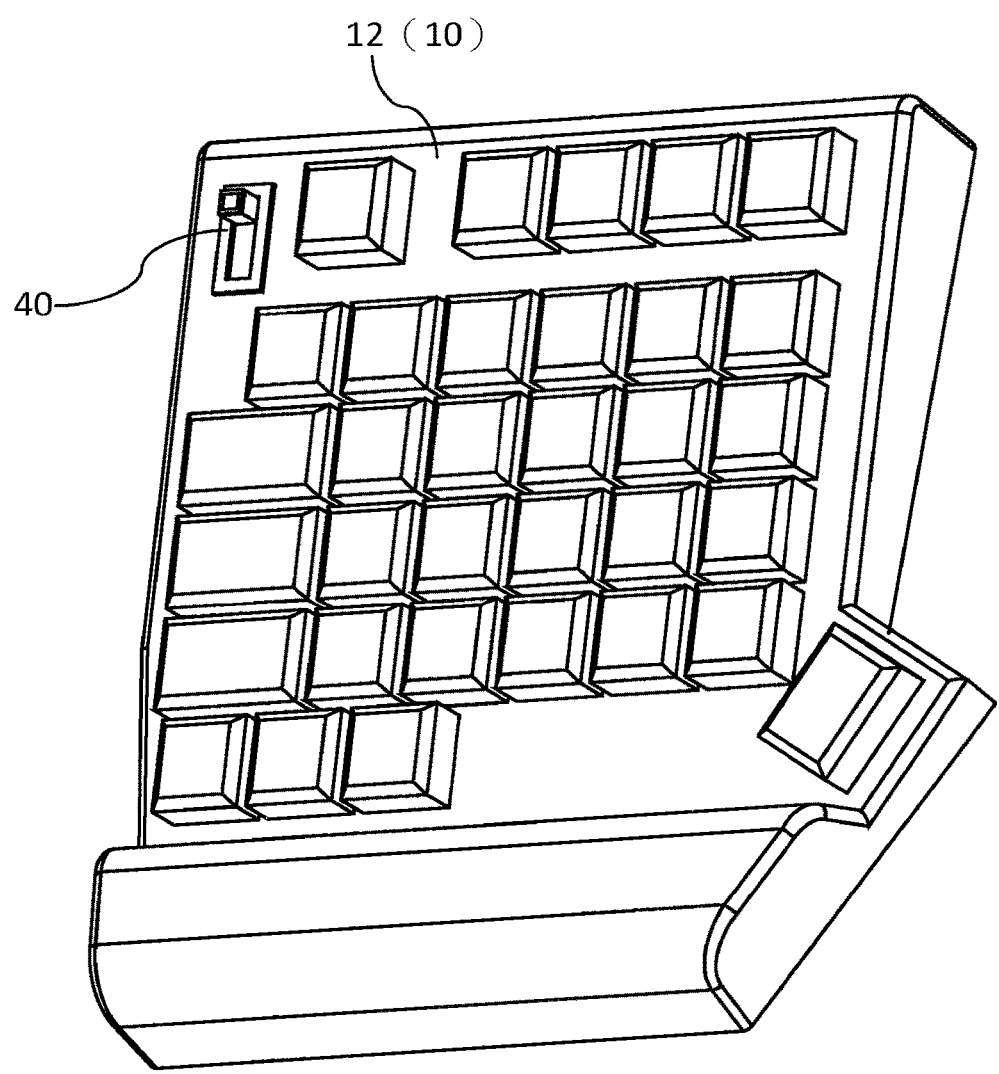
FIG. 45 is a schematic diagram showing that a multi-sectional switch switches and pairs computing devices according to a ninth embodiment of the present invention.

Referring to FIG. 45, FIG. 45 is a schematic diagram showing that a multi-sectional switch switches and pairs computing devices according to a ninth embodiment of the present invention. A keyboard (a left keyboard 12 is illustrated in FIG. 45) of this embodiment may be connected to/paired with a plurality of computing devices at the same time. However, a user can select only one of the set computing devices at the same time to operate or type data, and a manner of selection is manually switching by using a multi-sectional switch 40. For example, in an embodiment, the keyboard set 10 is connected to a computer by means of a USB connection cable. The connection cable setting is saved in a "device 1" of the multi-sectional switch 40. The keyboard set 10 is paired with a smart TV by means of Wi-Fi. The pairing setting is saved in a "device 2" of the multi-sectional switch 40. Further, the keyboard set 10 is paired with a virtual reality display device by means of Bluetooth. The pairing setting is saved in a "device 3" of the multi-sectional switch 40. The user only needs to correspond the computing device to the switch at the initial configuration, and subsequently, the keyboard set 10 may be quickly connected to the corresponding computing device by manually switching the multi-sectional switch 40. The keyboard set 10 of this embodiment has a multi-sectional switch 40 that can synchronously switch the left keyboard 12 and the right keyboard 14 to a selected computing device. Herein, the multi-sectional switch 40 is a slide switch provided on the left keyboard 12. In some embodiments, the multi-sectional switch 40 may be provided on the right keyboard 14. The multi-sectional switch 40 of this embodiment may be: a slide switch, a toggle switch, or a rocker switch.

In view of the above, the present invention provides a keyboard set that can be mounted on armrests of a general existing chair, so as to reduce fatigue and damages caused by a poor posture. Moreover, the keyboard may be easily moved to a general desktop for use according to user requirements, so as to make up for deficiencies of the prior art I. In the prior art II, particular armrest members need to be used to mount the keyboard on armrests. The armrest member has a great volume, and is difficult to be randomly detached and mounted to other existing armchairs. The present invention does not limit that the keyboard set is mounted on armrests of a particular customized chair, and when the user needs to eliminate and replace an old armchair, the user only needs to mount detachable supports to a new armchair. Therefore, compared with the prior art II, the present invention has the advantages of being more flexible, being easier to be detached/mounted, and having low costs.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A keyboard set, comprising:
    a left keyboard, comprising a plurality of keys;
    a right keyboard, comprising a plurality of keys, wherein the right keyboard is in a communication connection to the left keyboard;
    a first detachable support, one end thereof being connected to the left keyboard;
    a second detachable support, one end thereof being connected to the right keyboard; and
    two multidirectional angle adjusting mechanisms, wherein each of the multidirectional angle adjusting mechanisms comprises a spherical ball member and a hemi-spherical receptacle, these spherical ball members are respectively and correspondingly provided on one end of the first detachable support and the second detachable support, these hemi-spherical receptacles are respectively provided on the bottom portions of left keyboard and the right keyboard, the spherical ball member of the first detachable support is detachably and correspondingly provided in the hemi-spherical receptacle of the left keyboard, and the spherical ball member of the second detachable support is detachably and correspondingly provided in the hemi-spherical receptacle of the right keyboard;

wherein when the left keyboard is detached from the first detachable support and the right keyboard is detached from the second detachable support, the left keyboard and the right keyboard can be used on a general desktop.

2. The keyboard set according to claim 1, wherein each of the first detachable support and the second detachable support comprises a body and a base, one end of the body is provided with the spherical ball member, the other end of the body is connected to the base, and the first detachable support and the second detachable support are respectively connected to an armrest of a chair by means of the bases.

3. The keyboard set according to claim 2, wherein the first detachable support further comprises a pivoting member, the pivoting member being connected to the body and the base, and enabling the body to rotate relative to the base.

4. The keyboard set according to claim 1, further comprising at least one detachable expansion device, wherein the detachable expansion device is connected to the left keyboard or the right keyboard by means of a tenon structure.

5. The keyboard set according to claim 1, wherein the first detachable support comprises a base and at least one sucker, one side of the base is provided with the at least one sucker, the other side of the base is provided with an accommodation groove, and each of the spherical ball members is correspondingly provided in the accommodation groove of the base of the first detachable support.

6. The keyboard set according to claim 2, wherein each of the detachable supports further comprise a fixing member, the base is fixed on the armrest by means of the fixing member, and the fixing member is a screw, a double-sided adhesive, a clamp, an adjustable zip tie, a hook-and-loop, a sucker, or any combination of the foregoing.

7. The keyboard set according to claim 4, wherein a USB connector is respectively built in the left keyboard or/and the right keyboard, so as to enable the detachable expansion device to be electrically connected to the left keyboard or the right keyboard.

8. The keyboard set according to claim 4, wherein the detachable expansion device is a joystick, a numeric keyboard, a mouse, a trackball, or a touch panel.

9. The keyboard set according to claim 4, wherein the tenon mechanism is an L-shaped expansion member.

10. The keyboard set according to claim 1, further comprising a multi-sectional switch provided on the left keyboard or the right keyboard, wherein the multi-section switch is configured to select to be in a communication connection to one of a plurality of computing devices.

11. A keyboard set, comprising:
a left keyboard, comprising a plurality of keys and a first link mechanism;
a right keyboard, comprising a plurality of keys and a second link mechanism, wherein the right keyboard is in a communication connection to the left keyboard;
a first detachable support, comprising a third link mechanism, a first body, and a first base, wherein the third link mechanism and the first base are respectively connected to two ends of the first body, and the third link mechanism of the first detachable support is detachably and correspondingly connected to the first link mechanism of the left keyboard;
a second detachable support, comprising a fourth link mechanism, a second body, and a second base, wherein the fourth link mechanism and the second base are respectively connected to two ends of the second body, and the fourth link mechanism of the second detachable support is detachably and correspondingly connected to the second link mechanism of the right keyboard; and
two multidirectional angle adjusting mechanisms, wherein each of the multidirectional angle adjusting mechanisms comprises a spherical ball member and a hemi-spherical receptacle, these spherical ball members are respectively and correspondingly provided on one end, opposite to the third link mechanism, of the first body of the first detachable support and one end, opposite to the fourth link mechanism, of the second body of the second detachable support, these hemi-spherical receptacles are respectively provided on the first base of the first detachable support and the second base of the second detachable support, the spherical ball member of first detachable support is detachably and correspondingly provided in the hemi-spherical receptacle of the first base, and the spherical ball member of the second detachable support is detachably and correspondingly provided in the hemi-spherical receptacle of the second base.

12. The keyboard set according to claim 11, wherein the first base and the second base are respectively connected to an armrest of a chair.

13. The keyboard set according to claim 11, wherein the first link mechanism and the second link mechanism are a hemi-spherical receptacle, and the third link mechanism and the fourth link mechanism are a spherical ball member.

14. The keyboard set according to claim 11, wherein the first link mechanism and the second link mechanism are a magnet or a magnetic component, and the third link mechanism and the fourth link mechanism are a magnet or a magnetic component.

15. The keyboard set according to claim 11, further comprising at least one detachable expansion device, wherein the detachable expansion device is connected to the left keyboard or the right keyboard by means of a tenon structure.

16. The keyboard set according to claim 15, wherein a USB connector is respectively built in the left keyboard or/and the right keyboard, so as to enable the detachable expansion device to be electrically connected to the left keyboard or the right keyboard.

17. The keyboard set according to claim 15, wherein the detachable expansion device is a joystick, a numeric keyboard, a mouse, a trackball, or a touch panel.

18. The keyboard set according to claim 15, wherein the tenon mechanism is an L-shaped expansion member.

19. The keyboard set according to claim 11, wherein each of the first detachable support and the second detachable support further comprises a fixing member, the first base and the second base are respectively fixed on the armrests by means of the fixing members, and the fixing member is a screw, a double-sided adhesive, a clamp, an adjustable zip tie, a hook-and-loop, a sucker, or any combination of the foregoing.

20. The keyboard set according to claim 11, further comprising a multi-sectional switch provided on the left keyboard or the right keyboard, wherein the multi-section switch is configured to select to be in a communication connection to one of a plurality of computing devices.

* * * * *